United States Patent
van den Nieuwelaar et al.

(12) 
(10) Patent No.: US 6,312,326 B1
(45) Date of Patent: Nov. 6, 2001

(54) METHOD AND DEVICE FOR MAKING AN INCISION IN THE SKIN OF A SLAUGHTERED ANIMAL, AND FOR PERFORMING A SUBCUTANEOUS OPERATION

(75) Inventors: Adrianus J. van den Nieuwelaar, Gemert; Cornelis D. van Harskamp, Boxmeer; Bastiaan W.J.E.J. Drabbels, Vierlingsbeek, all of (NL)

(73) Assignee: Stork PMT B.V., Boxmeer (NL)

( * ) Notice: Subject to any disclaimer, the term of this patent is extended or adjusted under 35 U.S.C. 154(b) by 0 days.

(21) Appl. No.: 09/537,695

(22) Filed: Mar. 28, 2000

Related U.S. Application Data

(63) Continuation of application No. PCT/NL98/00561, filed on Sep. 29, 1998.

(30) Foreign Application Priority Data

Sep. 29, 1997 (WO) .................................. PCT/NL97/00540

(51) Int. Cl.⁷ .................................................. A22C 21/00
(52) U.S. Cl. ............................................ 452/120; 452/122
(58) Field of Search .................................. 452/120, 109, 452/122

(56) References Cited

U.S. PATENT DOCUMENTS

| | | |
|---|---|---|
| 2,795,815 | 6/1957 | Dahlberg . |
| 4,059,868 * | 11/1977 | Meyn .................................. 452/120 |
| 4,265,001 * | 5/1981 | Hathorn et al. ...................... 452/120 |
| 4,339,849 | 7/1982 | Van Mil . |
| 4,418,445 | 12/1983 | Meyn et al. . |
| 4,467,500 * | 8/1984 | Olson ................................... 452/120 |
| 4,731,907 * | 3/1988 | Tieleman ............................... 452/120 |
| 5,062,820 | 11/1991 | Rankin et al. . |
| 5,816,904 * | 10/1998 | Tieleman et al. .................... 452/120 |

FOREIGN PATENT DOCUMENTS

| | | |
|---|---|---|
| 0 761 100 A1 | 3/1997 | (EP) . |
| 705042 | 5/1931 | (FR) . |
| 2688979 | 10/1993 | (FR) . |
| 7306058 | 11/1974 | (NL) . |
| 7510362 | 3/1977 | (NL) . |
| 7801712 | 8/1979 | (NL) . |
| 8101527 | 10/1982 | (NL) . |
| WO 96/34533 | 11/1996 | (WO) . |
| WO 99/16321 | 4/1999 | (WO) . |

OTHER PUBLICATIONS

International Search Report in PCT/NL97/00540.
International Search Report in PCT/NL98/00561.

* cited by examiner

*Primary Examiner*—Willis Little
(74) *Attorney, Agent, or Firm*—Kilpatrick Stockton LLP; Kristin L. Johnson

(57) ABSTRACT

In a method and device for making an incision in the skin of the belly of a slaughtered animal which is provided with a vent opening produced by cutting out the vent, the skin is processed at a position near the bottom point of the breastbone of the animal, and an incision is made between the vent opening and said position. In order to support the skin during the skin processing operation, a supporting element is fitted subcutaneously through an opening in the skin. In a method and device for processing a slaughtered animal, prior to or during the evisceration of the carcass of the animal, tissue connections are broken between the belly skin and the viscera, in particular between the belly fat situated on the inside of the belly skin and the stomach.

75 Claims, 15 Drawing Sheets

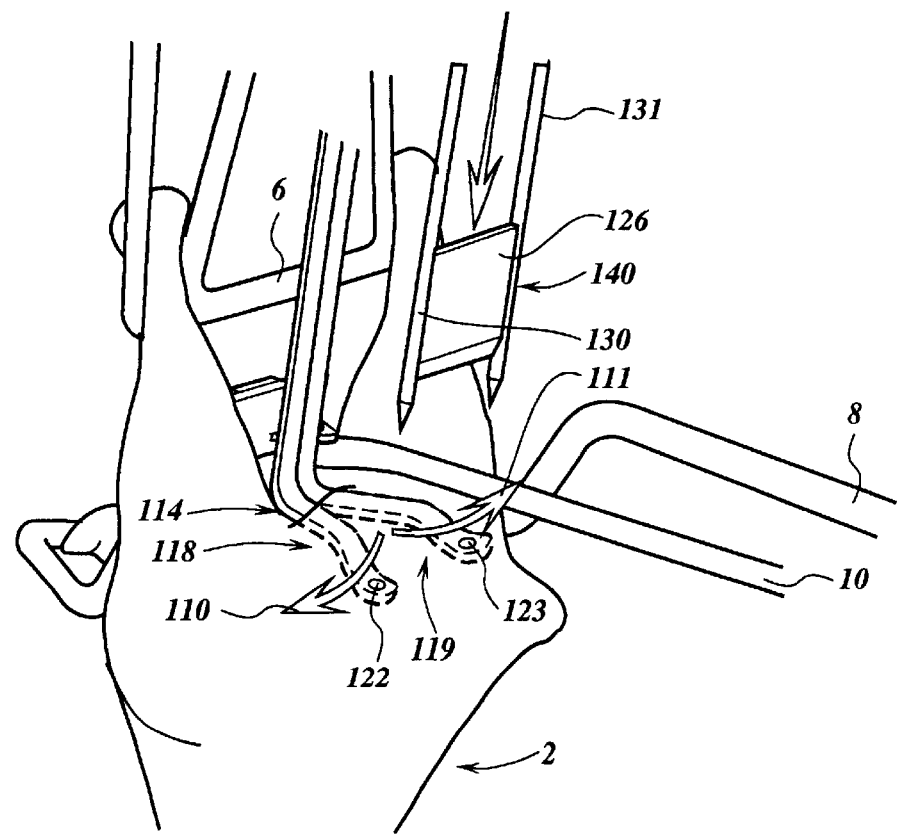
Fig. 6
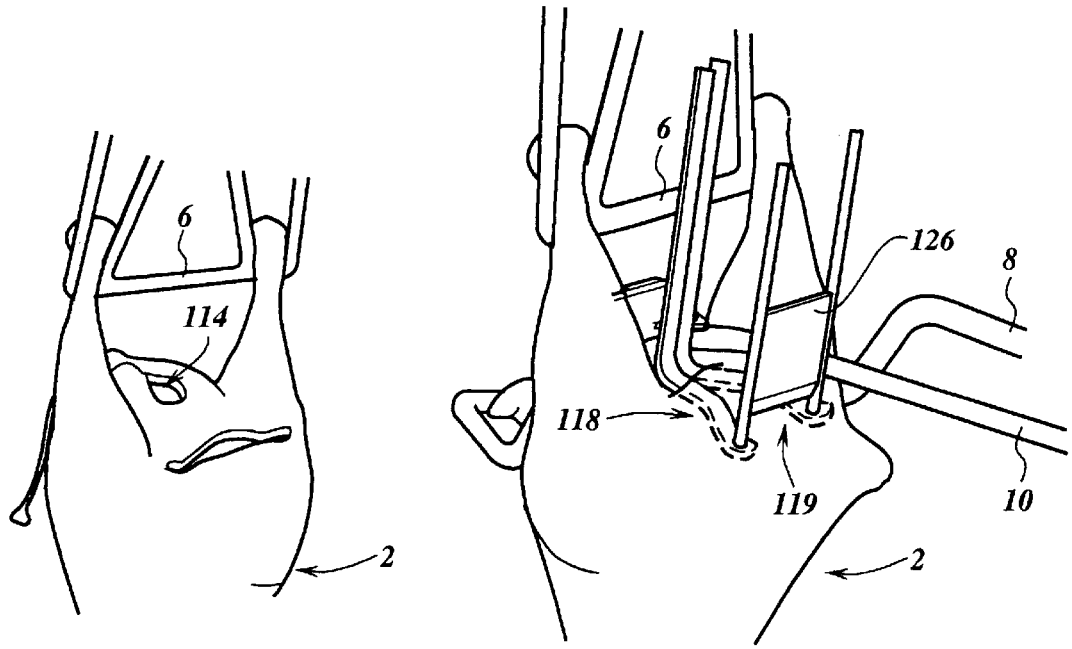
Fig. 6b
Fig. 6a

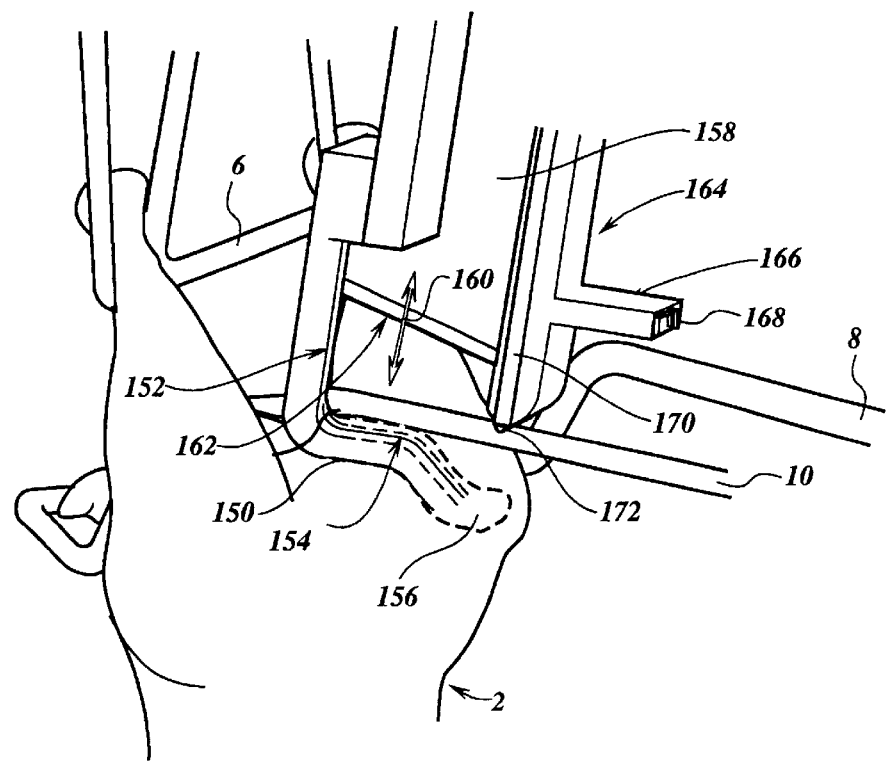
*Fig. 6c*
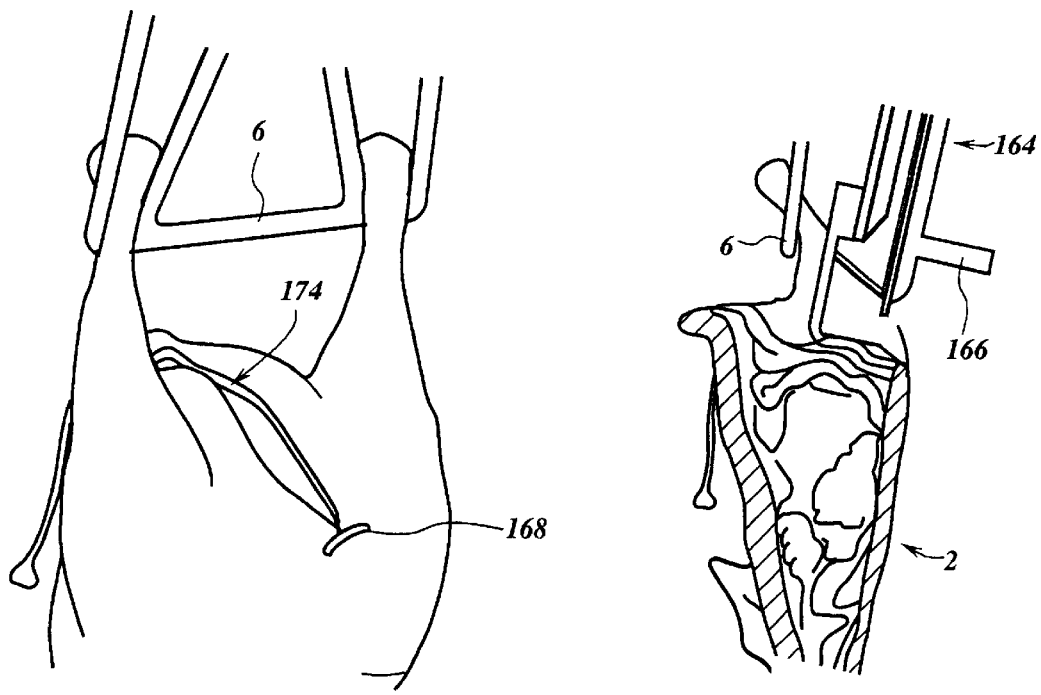
*Fig. 6e*  *Fig. 6d*

METHOD AND DEVICE FOR MAKING AN INCISION IN THE SKIN OF A SLAUGHTERED ANIMAL, AND FOR PERFORMING A SUBCUTANEOUS OPERATION

CROSS-REFERENCE TO RELATED APPLICATIONS

This is a continuation application of PCT/NL98/00561 filed Sep. 29, 1998.

FIELD OF THE INVENTION

This invention relates to a method and device for making an incision in the skin of a slaughtered animal, in particular, but not limited to, an incision in the belly of a slaughtered bird. The invention also relates to a method and device for performing a subcutaneous operation.

DISCUSSION OF THE PRIOR ART

Methods and devices for opening the body cavity of a slaughtered bird by means of an incision are known from, for example, Dutch Patent Application No. 8,101,527, International Patent Application No. 96/34,533 and European Patent Application No. 761,100. The first two publications describe making a transverse incision in the belly skin of the bird, while the last-mentioned publication describes making an incision with a shearing device through the belly skin, which incision extends from an opening around the cloaca to the tip of the breast.

A drawback of the incisions made by means of the known devices is that at one or both ends thereof said incisions easily give rise to uncontrolled tearing, in particular if the skin is under tensile stress, which is the case, for example, in the region of the tip of the breast of the bird. The direction and the length of the tears are uncontrollable, so that it is a common occurrence, for example during the making of an incision running between the cloaca and the tip of the breast, for the tip of the breast situated near the end of the incision ultimately to become exposed as a result of a tear occurring. This is disadvantageous for the presentation when the bird is being sold, especially since the exposed fillet will become discoloured as a result. It is also disadvantageous for the hygiene of the bird, since the ragged edges of the tear encourage germ growth at that point.

Another drawback of the devices according to the prior art is that the position and the lengths of the incisions varies depending on the variations which always occur in the dimensions of the individual birds. The uniformity of the incisions which is necessary from the point of view of quality and which is required in the veterinary inspection therefore cannot be guaranteed.

Another drawback of the prior art is that when the tools used for cutting are being inserted under the skin the viscera situated under the skin, in particular the intestines, can easily become damaged.

SUMMARY OF THE INVENTION

The object of the invention is to overcome the drawbacks of the prior art, and to that end the invention in the first place provides a method as described in the appended claims. By performing the skin processing operation, which comprises, for example, fitting a clamping element for clamping a piece of skin, treating a part of the skin thermally (preferably heating, but also cooling in some circumstances), optically or chemically (for example with glycerine or polyphosphate), applying a setting liquid (such as a melted fat) to a part of the skin, making a hole in the skin, or a combination of such skin operations, tearing at one end of an incision is counteracted or prevented entirely, so that the incision has a defined end.

The incision may contain a series of non-interconnected sub-incisions.

It is assumed below that the operation to prevent tearing at the end of an incision is making a hole in the skin.

The sequence of making an incision and one or more holes in the skin in principle is not important. However, if great cutting safety is required, and tearing must be avoided with a high degree of certainty, a hole is made in the skin before the incision is made. A short processing time is obtained if a hole is made in the skin substantially at the same time as the incision.

In order as far as possible to prevent peaks in tensile stress from occurring in the skin near a hole in the skin, the hole in the skin is preferably rounded.

A very suitable method of making a hole in the skin quickly and reliably is a punching operation. On the other hand, a hole in the skin can be obtained by drilling or cutting, such as laser or water jet cutting.

With a method of cutting away a part of the skin with the dimensions of the hole, leaving a residual connection, for forming the at least one hole in the skin, it is ensured that a piece of skin cut away in order to form a hole in the skin does not become detached from the slaughtered animal and fall into an undesirable place, such as into the carcass of the slaughtered animal, causing pollution or contamination there or leading to disruptions during subsequent automated slaughter operations. Furthermore, such an incision to form a hole in the skin does not involve a loss in weight yield of the eviscerated carcass.

In addition, a hole supporting element and/or an incision supporting element can advantageously be fitted subcutaneously through an opening in the skin during the making of at least one hole in the skin, or in order to support the skin during the making of the incision, respectively, thus, on the one hand, minimizing the risk of damage to the viscera situated near the incision and, on the other hand, ensuring a correct position of the skin in the abdominal region, during the performance of a skin operation.

Preferably, during making the incision, the skin is not tensioned.

When the incision contains a series of sub-incisions, preferably the skin parts between the sub-incisions are torn by the hole supporting element and/or the incision supporting element by moving such element through the skin area containing the sub-incisions.

If during the performance of a skin operation the carcass of the slaughtered animal is brought to above atmospheric gas pressure at least at the position of the skin operation, space is produced under the skin, so that, on the one hand, the risk of damage to viscera by tools used for the skin operation is reduced and, on the other hand, tools can be inserted under the skin, and be removed from under the skin, more easily.

For further protection of the viscera, such as in particular the intestines, a viscera protection element is inserted through the skin opening in the carcass preferably prior to or during the insertion of the hole supporting element and/or incision supporting element. Said viscera protection element can move viscera out of the path of a supporting element without damaging them, and can also shield said viscera from the supporting elements and other tools used for making a hole and an incision.

During the subcutaneous fitting of the hole supporting element and/or incision supporting element or the period that they have been fitted, the opportunity can be taken to break tissue connections in the carcass. This is an advantage during the subsequent evisceration, since the reduced mechanical resistance makes such evisceration easier to carry out. Moreover, in this way in the case of, for example, a bird it is possible to increase the weight yield of the eviscerated carcass by breaking the connections between the fat layer situated on the inside of the belly skin and the viscera such as the stomach, with the result that the belly fat remains attached to the carcass. During conventional evisceration a large part of the fat layer would remain connected to the viscera, in particular to the stomach, which also makes subsequent harvesting of the viscera more difficult.

Said tissue connections are preferably broken by means of at least part of the hole supporting element or the incision supporting element. For that purpose, said at least part of the hole supporting element or the incision supporting element is expediently elongated and performs a rotating movement under the skin.

The invention also provides a device as described in the appended claims. The advantages applicable thereto have already been described above.

Further details of skin processing means which are in the form of perforating means for making a hole in the skin are given below.

It is pointed out here that the hole(s) in the skin is (are) made simply and extremely reliably by a device having perforating means which comprise a hole supporting element to be fitted under the skin and a perforating element fitted at the other side of the skin, the hole supporting element being adapted to interact with the perforating element to form the hole in the skin. In particular, the hole supporting element is provided with a through or blind hole, the perforating element being adapted to be inserted at least partially in the hole of the hole supporting element, in order to form the hole in the skin. In a preferred embodiment, the perforating element or the hole supporting element is provided with a cutting edge.

The perforating element preferably tapers to a point at the side facing the hole supporting element, with the result that even if there are slight deviations in the position of the perforating element relative to the hole of the hole supporting element, the perforating means still function reliably, owing to the centring effect of the pointed side of the perforating element. It is advantageous if the perforating element is rounded at the side facing the hole supporting element, since the skin can then be placed without damage in the hole of the hole supporting element, for forming the hole in the skin in a predetermined manner. If the transverse dimensions of the hole in the hole supporting element correspond substantially to or are smaller than the transverse dimensions of the part of the perforating element to be inserted in the hole of the hole supporting element, a hole in the skin whose transverse dimensions are determined by the transverse dimensions of the hole of the hole supporting element is obtained.

It is also possible to provide the hole supporting element with a stop face. The end of the perforating element facing the hole supporting element in that case is preferably provided with a cutting edge and designed in the form of, for example, a hollow tube. If said tube is connected to a suction device, the piece of skin removed for forming the hole in the skin can be discharged through the hollow tube, and in this way the piece of skin is prevented from falling into an undesired place.

In a preferred embodiment the cutting edge of the perforating element or the hole supporting element has ends which do not coincide. This ensures that the piece of skin cut away for forming the hole in the skin still remains connected to the remainder of the skin, with the result that the piece of skin cannot fall into an undesired place.

An incision in the skin of a slaughtered animal is made in a simple and extremely reliable way, minimizing the risks of adjacent viscera being damaged, in a device wherein the cutting means comprise an incision supporting element to be fitted under the skin and a cutting element fitted at the other side of the skin, which incision supporting element is adapted to interact with the cutting element, in order to make the incision. For this purpose, the cutting means are preferably designed such that the incision supporting element is provided with a through or blind slit, the cutting element being adapted to be inserted with a cutting edge thereof at least partially in the slit of the incision supporting element, in order to form the incision.

In a preferred embodiment the slit of the incision supporting element is bent, the cutting edge of the cutting element being designed to enter the slit of the incision supporting element in the region of the bend. The bend is situated at a distance from the ends of the slit, and can consequently ensure that, with a suitably chosen shape of the cutting edge of the cutting element the incision extends in opposite directions from the region of the bend. This considerably reduces the tension produced in the skin during the cutting.

A simple embodiment is obtained by making the incision supporting element and the hole supporting element a common supporting element. Simplicity of construction and efficiency are also obtained by interconnecting the cutting element and the perforating element and moving them in synchronism with each other.

A device having positioning means for positioning the processing means and the bottom point of the breastbone of the bird relative to each other, makes it possible to select the position of the skin processing operation in the optimum manner at the end of the incision situated near the bottom point of the breastbone, despite the different dimensions of birds to be processed, since it can be ensured that the distance between the processing point and the bottom point of the breastbone is the same for every bird. The positioning means preferably comprise a fixed or movable stop face which is adapted for making contact against the bottom point of the breast bone. The stop face may also be adapted to act on the outside of the body of the slaughtered animal. By providing a supporting element with a stop face for this purpose, the desired positioning of the perforating or cutting means can be achieved in a simple manner without loss of processing time.

In a preferred embodiment detection means for directly or indirectly determining the position of the bottom point of the breastbone are provided, the positioning means being adapted for positioning the carcass of the bird and the processing means relative to each other on the basis of the detection result of the detection means. The detection means can comprise, for example, a video camera and picture recognition means for directly determining the position of the bottom point of the breastbone, but they can also comprise mechanical, pneumatic, hydraulic or other types of detectors which determine the position of a carcass part, from which position the position of the bottom point of the breastbone can be derived with sufficient accuracy.

It is to be observed here that the processing means mentioned above need not necessarily perform skin processing operations as described above, but could also be taken to perform other processing operations, such as (other) cutting operations, filleting operations, deskinning operations, cloaca cutting, eviscerating, etc., in which a positioning of the breast bone may be the starting point for the processing operation.

In a preferred embodiment the device comprises gas supply means for introducing gas into the carcass of the slaughtered animal. This will cause the relatively flaccid belly skin to bulge outwards, which facilitates the subcutaneous fitting of supporting elements. Fitting the gas supply means, in particular the gas discharge means thereof, outside the carcass ensures that said means do not have too local an effect, thereby causing intestines, for example, to be blown out. Besides, both pollution of the gas supply means and cross-contamination are prevented in this way.

In order to achieve the insertion of supporting elements with a low risk of damage to viscera, use is made of a protection element which is fitted in the carcass prior to or during the subcutaneous fitting of a hole supporting element, incision supporting element or common supporting element. Such a protection element, which is preferably essentially cone-shaped, shields the viscera and/or pushes them out of the path of the supporting element.

If a supporting element is driven in a rotary manner, subcutaneous fitting of a, for example, substantially horizontally projecting supporting element in a carcass suspended by the legs can be achieved in a particularly simple way by means of rotation about a substantially vertical axis without, for example, a translation movement with a horizontal component being necessary. The above-mentioned supporting element is also designed for breaking tissue connections between the belly skin and the viscera, in particular between the belly fat situated on the inside of the belly skin and the stomach.

The invention also relates to a method and device for processing a slaughtered bird prior to the removal of viscera from the carcass of the bird.

Such methods and devices until now have been limited mainly to creating access to the interior of the carcass by cutting out the cloaca and making an incision in the belly or breast. The viscera are then removed from the carcass through the vent opening created. During the evisceration the viscera are subject to mechanical resistance from the carcass, because tissue connections therein have to be broken, which makes the evisceration operation difficult and not very well controlled.

The object of the invention is then to overcome this disadvantage, and to this end the invention provides a method and a device for processing a slaughtered bird prior to evisceration of the carcass of the bird, wherein tissue connections between the belly skin and the viscera, in particular between the belly fat situated on the inside of the belly skin and the stomach, are broken. Breaking connections between the belly skin and the viscera before the evisceration ensures that the mechanical resistance to which the viscera are subject during the evisceration is lowered and evisceration itself will be easier to perform. Breaking the connections between the belly fat situated on the inside of the belly skin and the stomach has the further advantage that the fat in question remains behind in the carcass and produces an increase in the weight yield of the carcass.

Owing to the fact that the fat in question does not remain connected to the stomach either, subsequent harvesting of the viscera, and the stomach in particular, can be carried out more easily. Making use of the opening produced by cutting out the cloaca for the access of separating means into the carcass can mean that the corresponding connections can be broken in a simple manner. Moreover, the corresponding method can then easily be combined with the cutting out of the cloaca, and in particular with the making of a belly incision, so that the above requires little or no additional time or space. Rotation of the separating means makes it possible to break the connections quickly in a manner which can be applied on an industrial scale. Given the nature of the connections which are broken, the scraping movement of the separating means has been found to be an advantageous way of breaking the connections.

Moving means are preferably provided for placing a protection element in the carcass prior to or during the movement of the separating means. This gives the advantage of limiting the risk of damage to viscera.

The invention also relates to a method and device for the processing (such as making an incision in the skin) of a slaughtered bird, a substantially elongated element with a free end being inserted under the skin of the belly of the bird through a hole in the skin, such as an opening obtained by cutting out the cloaca. According to the appended claims, the elongated element can be placed in a very simple manner, and with very little or no risk at all of damage to viscera, in particular intestines, under the skin of the belly of a slaughtered bird.

In a preferred embodiment, the protection element is plate-shaped, so that a uniformly distributed pressure can be exerted on viscera, in which case the free end of the elongated element can be placed at the side facing away from the stop face of the protection element during the positioning of said free end.

The claims and advantages will be more readily appreciated as the same becomes better understood by reference to the following detailed description and considered in connection with the accompanying drawings in which like reference symbols designate like parts.

BRIEF DESCRIPTION OF THE DRAWINGS

FIG. 1a shows on a smaller scale a cross-section of the device according to FIG. 1 and the bird placed therein;

FIG. 1b shows a first alternative embodiment of a detail of the device according to FIG. 1;

FIG. 1c shows a second alternative embodiment of a detail of the device according to FIG. 1;

FIG. 1d shows a third alternative embodiment of a detail of the device according to FIG. 1;

FIG. 1e shows a fourth alternative embodiment of a detail of the device according to FIG. 1;

FIG. 1f shows a fifth alternative embodiment of a detail of the device according to FIG. 1;

FIG. 1g shows a sixth alternative embodiment of a detail of the device according to FIG. 1;

FIG. 5b illustrates in perspective view the result of the processing operation according to FIGS. 5 and 5a;

FIG. 6 shows a view in perspective of an embodiment of the device according to the invention for making a transverse incision in the belly of a slaughtered bird;

FIG. 6a shows on a smaller scale a view in perspective of the device and bird according to FIG. 6 at a subsequent processing stage;

FIG. 6b illustrates in perspective view the result of the processing operation performed with the device according to FIGS. 6 and 6a;

FIG. 6c illustrates in perspective view an embodiment of the device according to the invention for fitting a clamping element in the skin of the belly of a slaughtered bird;

FIG. 6d shows on a smaller scale a cross-section of the device and a bird according to FIG. 6c;

FIG. 6e illustrates in perspective view the result of the processing operation performed with the device according to FIGS. 6c and 6d;

DESCRIPTION OF THE PREFERRED EMBODIMENTS

Figure 1:
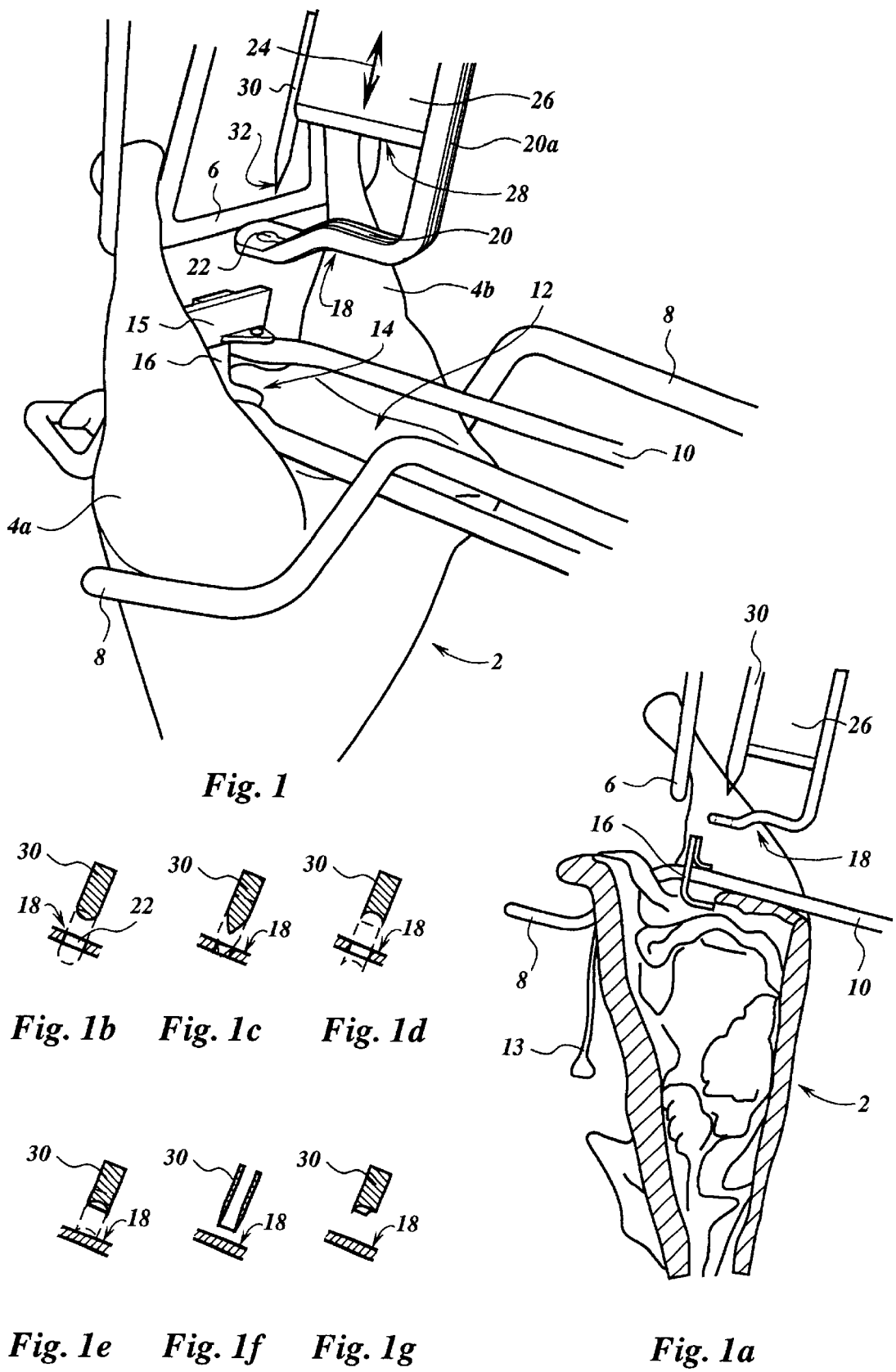
FIG. 1 shows a view in perspective of a part of a device according to the invention in which a slaughtered bird has been placed.

FIGS. 1 and 1a show a part of a slaughtered bird 2 which is suspended by its legs 4a and 4b in the region of the ankle joints from a double hook 6. An opening is made around the vent or cloaca 14 of the bird 2, through which opening the rectum 13 of the bird is removed from the body. The bird 2 is supported in the region near its hips on either side of the carcass by brackets 8, and is also supported between the legs 4a and 4b by a substantially U-shaped bracket 10 extending over the belly 12 and the region of the cloaca 14 on the insides of the thighs of the bird 2. A foot 16 which is substantially L-shaped in cross-section is fitted by means of a bridge 15 on the bracket 10, which foot can be inserted through the above-mentioned cloaca opening into the body of the bird 2, for pushing away and shielding viscera, as FIG. 1a shows.

A combined incision supporting element and hole supporting element, for short called supporting element 18, for insertion under the belly skin of the bird 2, is fitted movably above the brackets 8 and 10, which element is substantially L-shaped and is provided along its length with a groove 20 which ends in a hole 22 near the free end. A part 20a of the groove 20 forms a guide for a knife 26 with a cutting edge 28 which is movable in the directions of double arrow 24. A perforating element 30 which is movable in the directions of the arrow 24 is fitted along the side of the knife 26 facing away from the groove part 20. In FIG. 1 and subsequent figures the knife 26 and the perforating element 30 move in synchronism (and they can be connected mechanically to each other), but this is not essential; the knife 26 and the perforating element 30 can also be moved independently of each other. The perforating element 30 has a sharp point 32 at its free end. The groove 20 and the hole 22 have such transverse measurements that the knife 26 and the perforating element 30 respectively can pass through them.

In the embodiment shown in FIG. 1 the foot 16 is fixed to the bracket 10. However, this is not essential; the foot 16 can also be fitted on an arm which is movable in a controllable manner, in order to take the foot in a suitable manner and at a suitable time to a suitable point into the body of the bird.

The perforating element 30 and the hole supporting element can be designed in different ways, some of which are shown in FIGS. 1b to 1g inclusive.

In FIG. 1b the perforating element is provided with a rounded tip. The transverse measurements of the perforating element 30 are slightly smaller than those of the hole 22 in the supporting element 18, so that the perforating element can project through the hole, as illustrated by a dotted line. The perforating means shown in FIG. 1b can produce a hole in the skin by a shearing operation.

FIG. 1c shows a hole supporting element 18 with a hole which has smaller transverse measurements than those of the perforating element 30. The top edge of the hole acts as a cutting edge when the skin is clamped by the perforating element between the hole supporting element 18 and the perforating element 30.

In FIG. 1d the tip of the perforating element is provided with a cylinder-segment-shaped cutting edge, so that a hole in the skin can be obtained by a combined shearing and cutting operation.

FIG. 1e shows a perforating element 30 with a circular cutting edge, combined with a piece of flat material as the hole supporting element 18. A hole in the skin is produced purely by a cutting operation here.

FIG. 1f differs from FIG. 1e in that the perforating element 30 is formed by a hollow tube. The pieces of skin which have been cut out can be discharged by connecting this tube to suction means (not shown in any further detail).

FIG. 1g shows a perforating element 30 with a cutting edge in the form of a semi-circular arc. A piece of flat material again serves as the hole supporting element 18. Since the cutting edge does not go all the way round, a piece of skin will not be cut out. Nevertheless, a hole is still produced by the fact that the piece of skin determined by the incision not completing the circle ultimately hangs loose.

Figure 2:
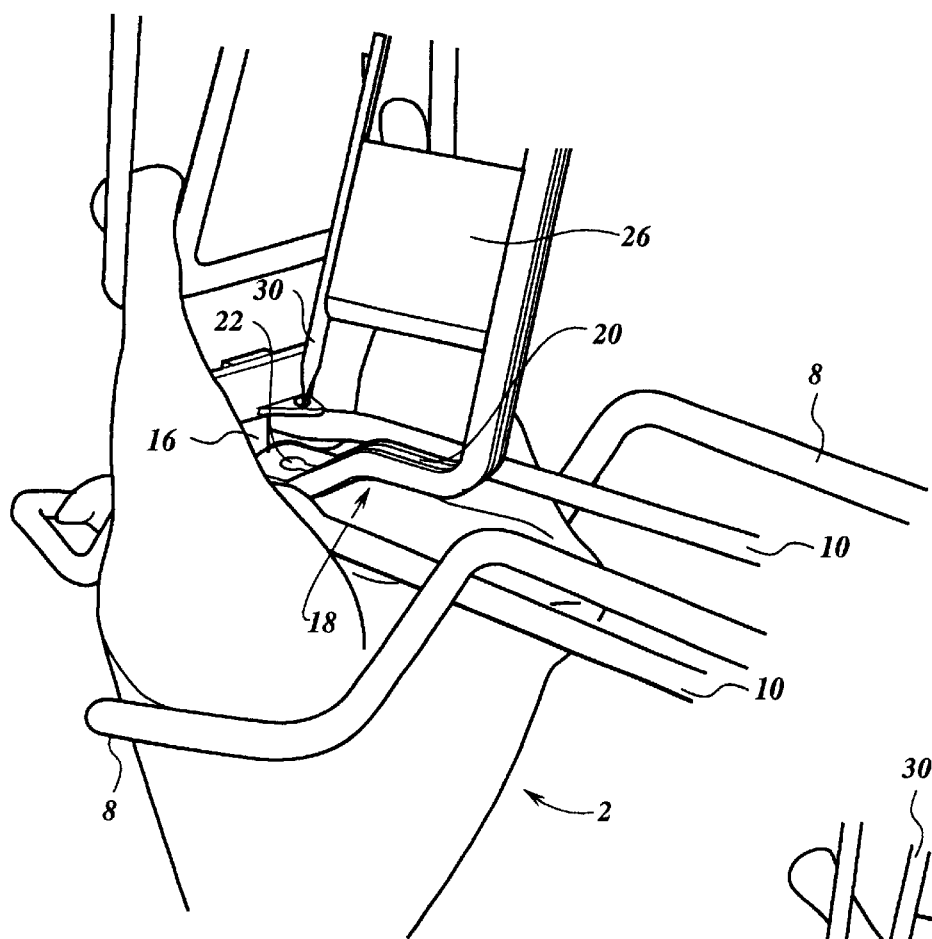
FIG. 2 shows a view in perspective of the device and bird according to FIG. 1 at a subsequent processing stage.
Figure 2A:
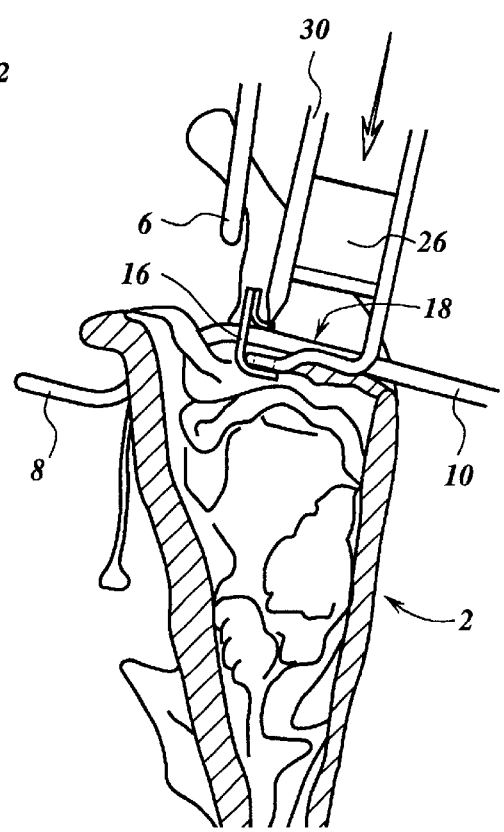
FIG. 2a shows on a smaller scale a cross-section of the device and bird according to FIG. 2.

FIGS. 2 and 2*a* illustrate a substantially synchronous downward movement in the direction of arrow 24*a* of the assembly of supporting element 18, knife 26 and perforating element 30, the free end of the supporting element 18 ultimately coming to rest on the free end of the foot 16.

Figure 3:
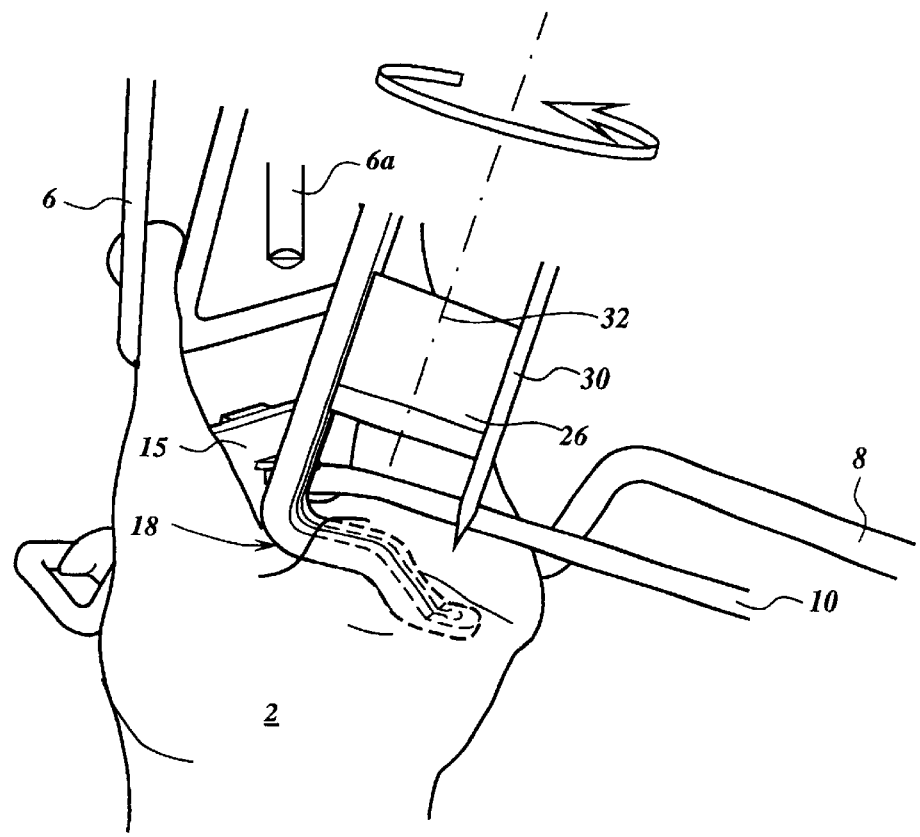
FIG. 3 shows a view in perspective of the device and bird according to FIG. 2 at a subsequent processing stage.
Figure 3A:
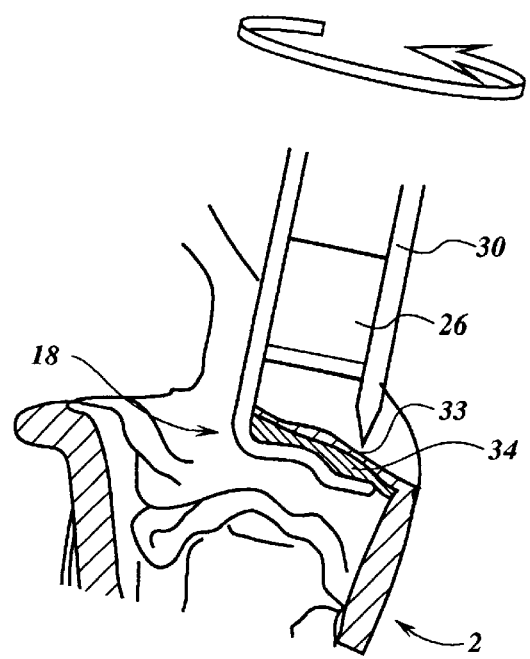
FIG. 3a shows on a smaller scale a cross-section of the device and bird according to FIG. 3.

The supporting element 18 is subsequently rotated through approx. 180 degrees in an anticlockwise direction— viewed from above—about an imaginary line 32, the free end of the supporting element 18 moving along the left leg of the bird under the belly skin 33 and over the viscera. FIGS. 3 and 3*a* indicate the position which is then reached. It should be pointed out that in FIG. 3 and following figures parts of the device which are not relevant are omitted, in order to increase clarity.

As FIG. 3*a* in particular illustrates, the supporting element 18 moves between the viscera and a layer of fat 34 situated underneath the belly skin 33, so that tissue connections between the layer of fat 34 and the viscera, in particular the stomach, which adjoins the region of rotation of the free end of supporting element 18, are broken, and connections between the layer of fat 34 and the belly skin 33 remain intact. Prior to the rotation of the supporting element, the belly skin can already be lifted slightly by blowing air underneath it, for example by directing a jet of air from a position near the hook 6 from a tube 6*a* at the opening 14. As FIGS. 3 and 3*a* show, the knife 26 and the perforating element 30 rotate along with the supporting element 18.

Figure 4:
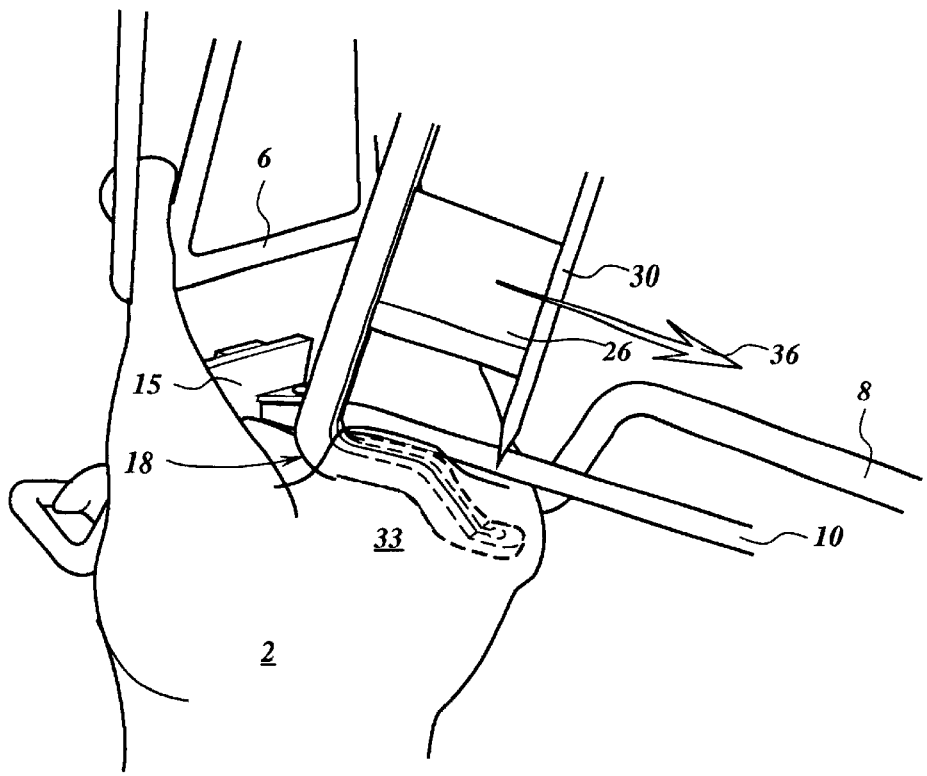
FIG. 4 shows a view in perspective of the device and bird according to FIG. 3 at a subsequent processing stage.
Figure 4A:
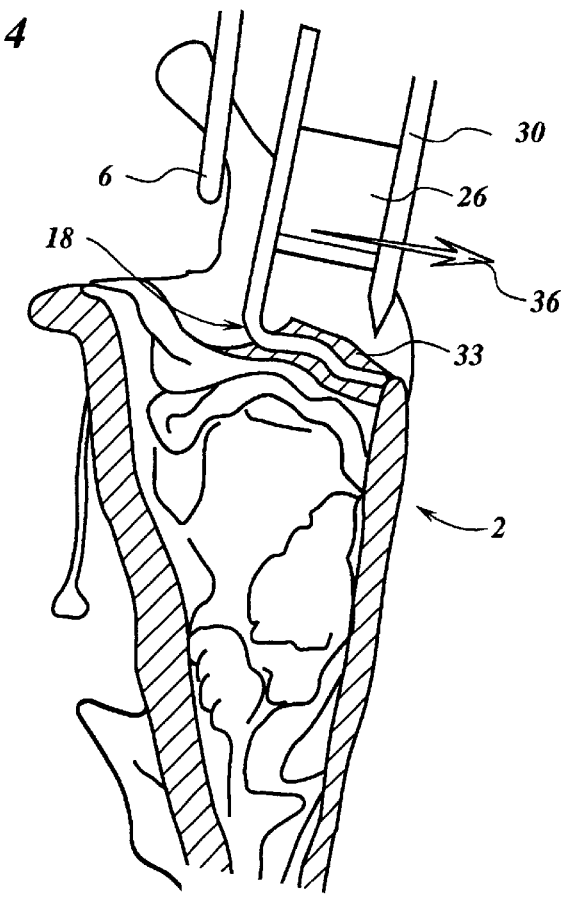
FIG. 4a shows on a smaller scale a cross-section of the device and bird according to FIG. 4.

FIGS. 4 and 4*a* illustrate how the belly skin 33 of the bird 2 is then moved by a movement of the assembly of supporting element 18, knife 26 and perforating element 30 in the direction of arrow 36, until the free end of the supporting element 18 runs against the bottom point of the breastbone. Accurate positioning of the supporting element 18, the knife 26 and the perforating element 30 relative to the bottom point of the breastbone is obtained in this way.

It should be pointed out that moving the assembly of supporting element 18, knife 26 and perforating element 30 against the bottom point of the breastbone can be replaced by a movement of the bird in the direction of the free end of the supporting element 18 until the bottom point of the breastbone runs against the supporting element 18. Both the above-mentioned assembly and the bird can also be moved towards each other, in order to achieve the desired position of the perforating element. In this connection reference is also made to FIGS. 9*a*–9*c*.

Figure 5:
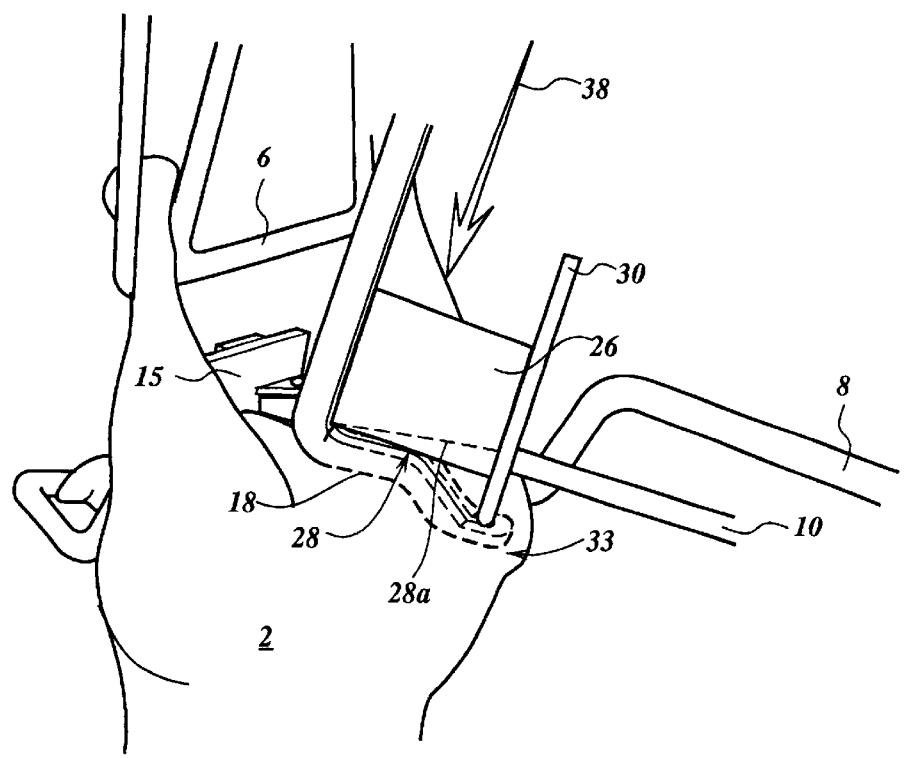
FIG. 5 shows a view in perspective of the device and bird according to FIG. 4 at a subsequent processing stage.
Figure 5B:
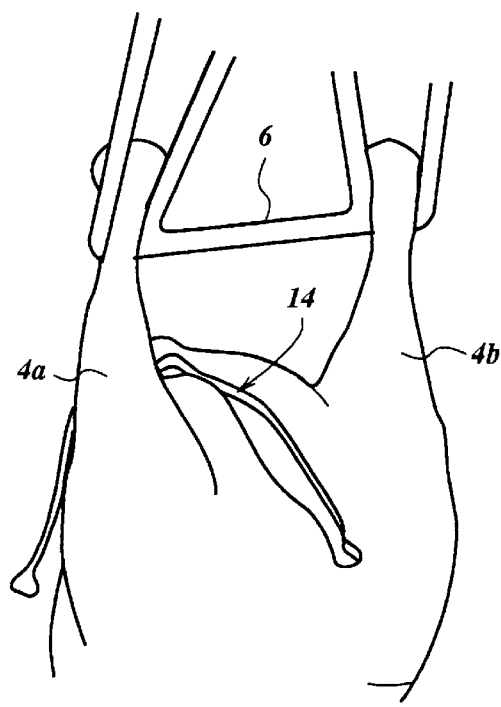
Figure 5A:
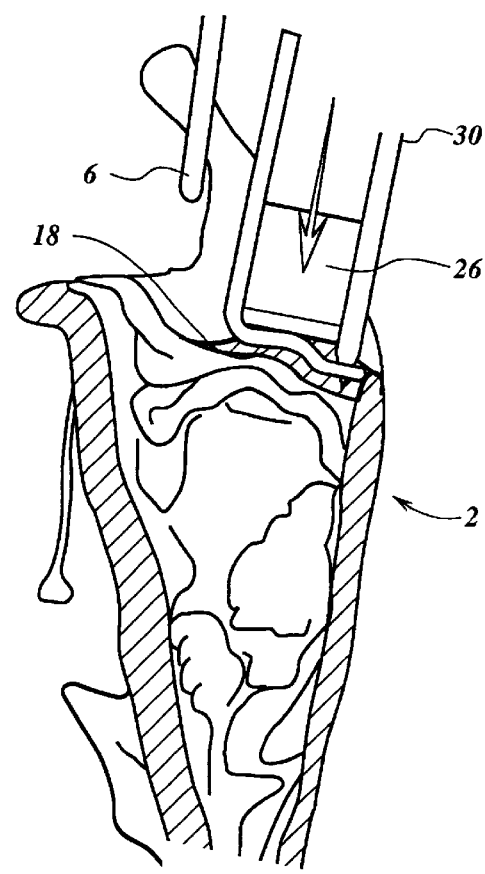
FIG. 5a shows on a smaller scale a cross-section of the device and bird according to FIG. 5.

FIGS. 5 and 5*a* illustrate how the perforating element 30 and the knife 26 are moved downwards in the direction of arrow 38 after contact has been made with the tip of the breast. The end 32 of the perforating element 30 in this case moves through the belly skin 33 and through the hole 22 of the supporting element 18, thereby forming a hole in the belly skin 33. In the same downward movement the knife 26 cuts through the belly skin 33 between the opening 14 and the hole in the skin, the cutting edge 28 of the knife 26 going into the groove 20 of the supporting element 18. Were the cutting edge of the knife to run according to the dashed line 28*a* in FIG. 5, the result would be that the incision would be produced gradually from the opening 14 to the hole in the skin. After the supporting element 18, the knife 26 and the perforating element 30 have subsequently been moved away, the bird 2 has been provided with a belly incision running from the opening 14 until near the tip of the breast, and ending there in the hole in the skin, as FIG. 5*b* illustrates.

Figure 5C:
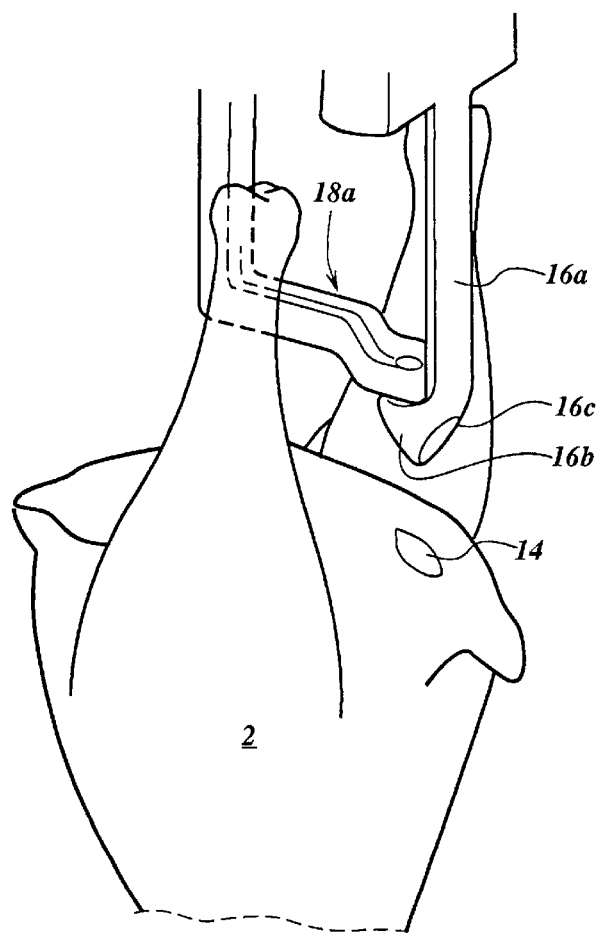
FIG. 5c shows a view in perspective of a bird and an alternative embodiment of the device according to the invention.

FIGS. 5*c*, 5*d*, 5*e* and 5*f* show a slaughtered bird 2 having a cloaca opening 14 made by a cloaca cutter known per se. For clarity, the part of the rectum normally hanging from the cloaca opening 14 after the operation of the cloaca cutter, has been omitted in the Figures. Also for clarity, a hook such as hook 6 shown in FIG. 1 or any other support for holding the bird 2 in the position shown in FIGS. 5*c*–5*f* has been omitted. FIG. 5*c* shows a combined hole supporting element/incision supporting element 18*a* of the type shown in FIG. 1. The free end of the combined supporting element 18*a* is positioned above an essentially cone-shaped end 16*b* of a viscera protection element 16*a*. Both the combined supporting element 18*a* and the viscera protection element 16*a* are actuated in a controlled way by electrical, mechanical, pneumatic or hydraulic drives known per se, which are not shown in the Figures.

Figure 5D:
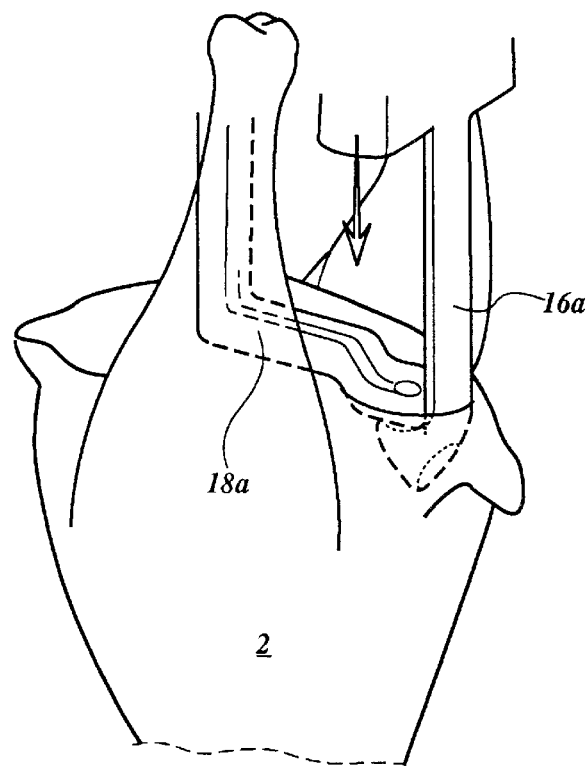
FIGS. 5d, 5e and 5f show subsequent processing stages carried out with the device according to FIG. 5c.

From the position shown in FIG. 5*c*, the combined supporting element 18*a* and the viscera protection element 16*a* are moved downwards synchronously until the position shown in FIG. 5*d* is reached, in which the cone-shaped end of the viscera protection element 16*a* and the free end of the combined supporting element 18*a* are inside the body of the bird 2. The cone-shaped end 16*b* of the viscera protection element 16*a* may provide a self-centering action relative to the cloaca opening 14, thus compensating for alignment errors between the viscera protection element 16*a* and the cloaca opening 14. The cone-shaped end 16*b* of the viscera protection element 16*a* is optionally provided with a recess 16*c* at the side of the part of the rectum hanging from the cloaca opening 14 (not shown in the Figure), thus preventing damage to the rectum during the operation of the viscera protection element, and preventing faecal contamination of the bird.

Figure 5E:
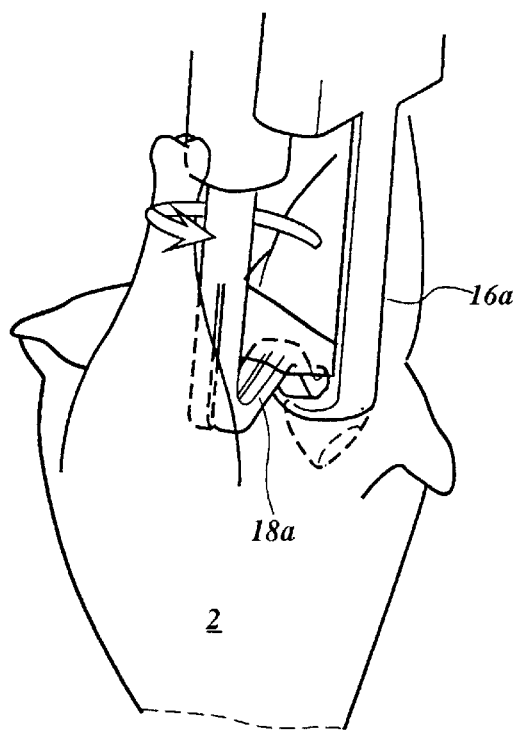
Figure 5F:
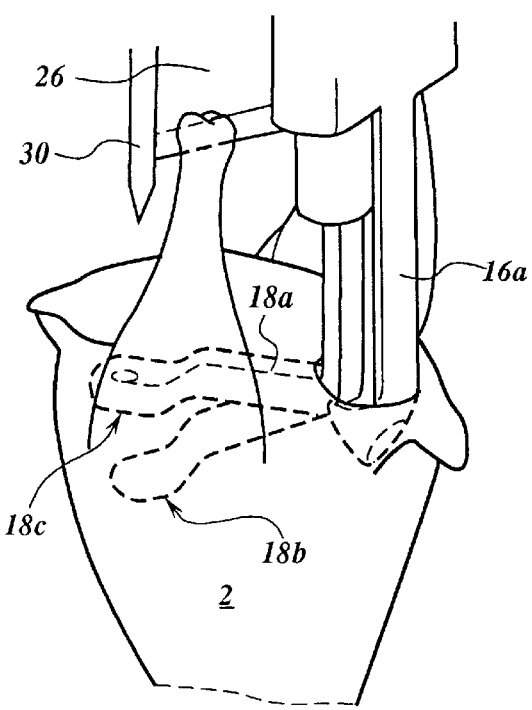

Starting from the situation shown in FIG. 5*d*, the combined supporting element 18*a* is rotated counter-clockwise (when viewed from above) under the abdominal skin of the bird, as illustrated by the arrow in FIG. 5*e*. As FIG. 5*f* shows, the rotation of the combined supporting element 18*a* is continued until the position indicated with 18*b* in FIG. 5*f* is reached, and next the combined supporting element 18*a* is rotated back clockwise (when viewed from above) through a small angle such that the free end thereof points in the direction of the breastbone of the bird 2. This position is indicated with 18*c* in FIG. 5*f*. During the rotation of the combined supporting element 18*a* under the abdominal skin of the bird 2, the tissue connections between the abdominal fat and the viscera are broken. The rotation of the combined supporting element 18*a* is such that the upstanding portion thereof at the end of the rotation is situated essentially above the cone-shaped end 16*b* of the viscera protection element 16*a*. In the final position of the combined supporting element 18*a* shown in FIG. 5*f*, an incision of the abdominal skin may be made as described above using the knife 26 and perforating element 30.

FIGS. 6, 6*a* and 6*b* indicate how a transverse incision can be made in the belly of a slaughtered bird in the same way as indicated above. For this purpose, an assembly 140 with two perforating elements 130, 131 is provided, with a knife 126 between them. Two hole supporting elements 118, 119 with holes 122, 123 at their ends are fitted in the carcass by way of a vent opening 114. The hole supporting elements 118, 119 are rotatable about a vertical axis in opposite directions according to arrows 110, 111, to a position in which the holes 122, 123 ultimately lie subcutaneously in line with the perforating elements 130, 131. Holes will be made at the ends of the ultimate incision by a downward movement of the assembly 140. During the same movement the knife 126 will make an incision in the transverse direction in the belly of the slaughtered bird. The above is illustrated in FIG. 6a. After withdrawal of the assembly 140, the operation has resulted in an incision as indicated in FIG. 6b.

FIGS. 6c, 6d and 6e indicate how an incision can be made in the belly of a slaughtered bird, with a clamping element being fitted at the end situated near the tip of the breast of the bird, in order to prevent tearing of the skin at that point. For this purpose, provision is made for a supporting element 150, which is fitted in a manner similar to the supporting element 18 by means of a rotating movement under the belly skin of the bird 2. The supporting element 150 is provided with a groove 152 and a through slit 154, and at its free end bears a stop face 156. A side edge of a knife 158 is guided in the groove 152. The opposite side edge of the knife 158 is also guided in a groove (not visible in the Figures) which runs parallel to the groove 152. The knife 158 can be moved in the directions of double arrow 160, and the sharp side 162 of the knife 158 can be inserted through the skin of the bird 2 in the slit 154 of the supporting element 150. A clamping element fitting device 164, which can be moved independently of the knife 158 and the supporting element 150 in the directions of the double arrow 160, comprises a magazine 166 for substantially U-shaped staples 168 which can be ejected from the clamping element fitting device 164 at the point indicated by 172 by means of an ejection strip (not shown in any further detail) which is movable in a housing 170 of the clamping element fitting device 164. In this process the clamping element fitting device 164 is placed directly above or on the skin of the bird 2 above the stop face 156 of the supporting element 150. The result is that a part of skin near the tip of the breast of the bird 2 is clamped in a staple 168. Prior to, simultaneously with or subsequent to the placing of the staple 168, an incision 174 is made in the belly skin of the bird 2 by means of the knife 158. After withdrawal of the supporting element 150, the knife 158 and the clamping element fitting device 164, the operation has resulted in an incision, at the end of which facing the tip of the breast a staple 168 has been placed in the skin, in order to prevent tearing of the skin at that point.

The interaction between the knife 158 and the supporting element 150 is such that, when moving the knife 158 in the downward direction, the incision of the abdominal skin of the bird 2 starts between the breastbone and the cloaca opening, and develops in two opposite directions to the breastbone and the cloaca opening, respectively. The corresponding opposite cutting forces on the skin generated by the knife 158 during making the incision compensate each other, such that the abdominal skin stays in position.

Figures 7A, 7B, 7C:
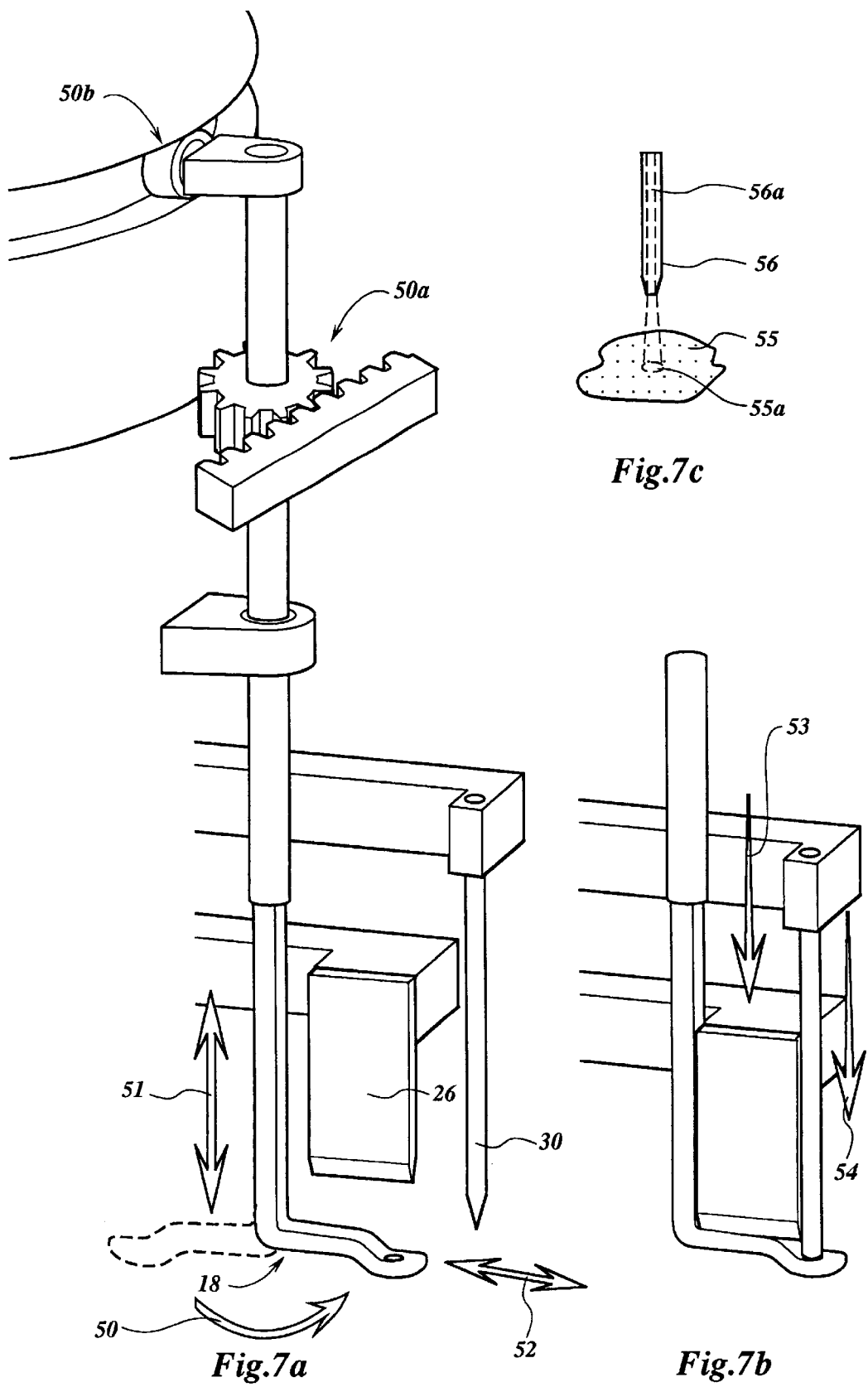
FIG. 7a shows a view in perspective of a part of an alternative device according to the invention.
FIG. 7b shows a view in perspective of the part according to FIG. 7a at a subsequent processing stage.
FIG. 7c shows a view in perspective of a skin processing means.

FIGS. 7a and 7b show a part of an embodiment in which the supporting element 18, the knife 26 and the perforating element 30 are fully mechanically disconnected. By means not shown or shown only diagrammatically, such as a gear rack drive 50a and a curved track control system 50b, the supporting element 18 can be rotated about a vertical axis as well as up and down in the vertical direction as well as to and fro in the horizontal direction, according to the double arrows 50, 51, and 52, respectively. The knife 26 and the perforating element 30 are movable independently of these movements and independently of each other in the vertical direction according to the arrows 53, 54, respectively, for making a hole in the skin and a cut, as FIG. 7b shows.

Figure 8A:
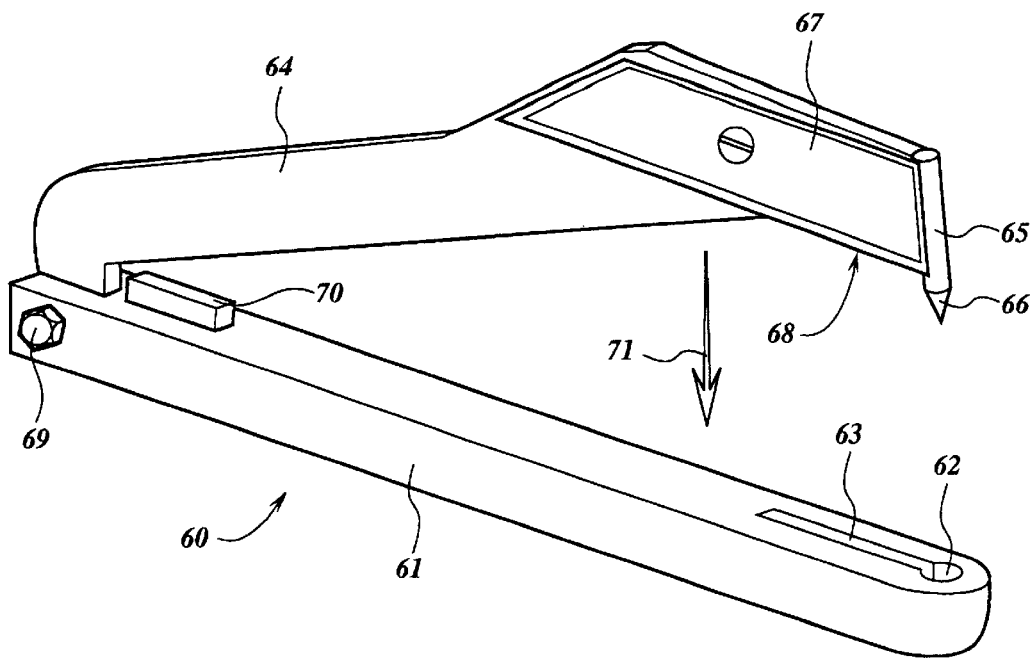
FIG. 8a shows a view in perspective of a part of a further embodiment of the device according to the invention.
Figure 8B:
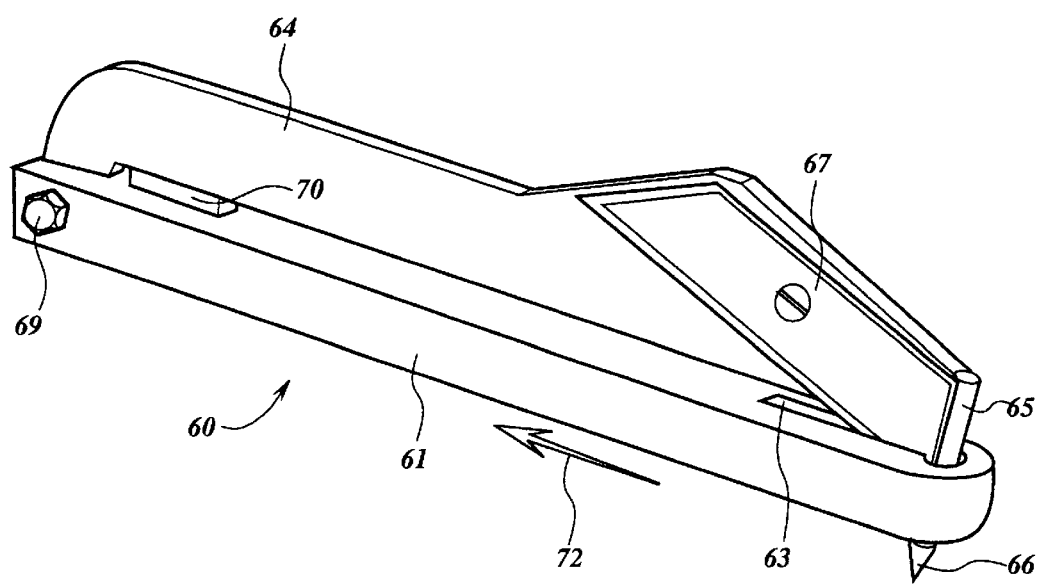
FIG. 8b shows a view in perspective of the device according to FIG. 8a at a subsequent processing stage.
Figure 8C:
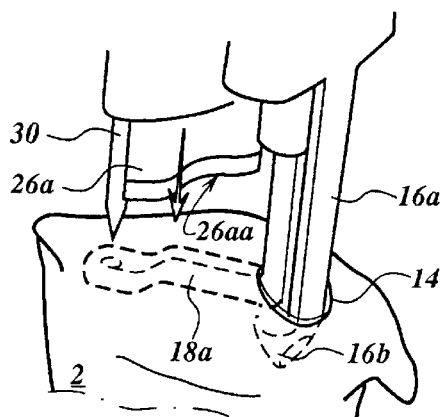
FIGS. 8c, 8d, 8e and 8f each show a view in perspective of a part of a further embodiment of the device according to the invention.
Figure 8D:
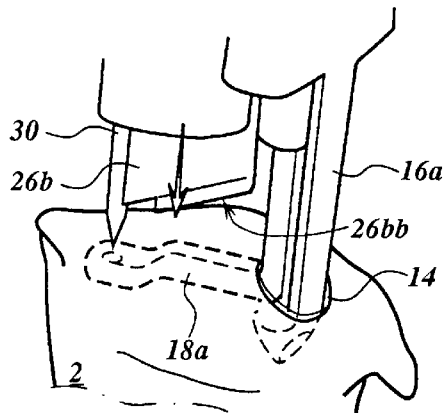
Figure 8E:
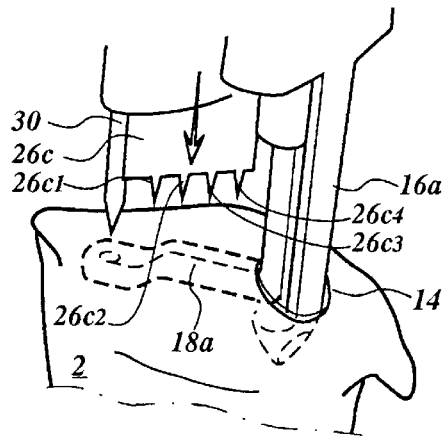
Figure 8F:
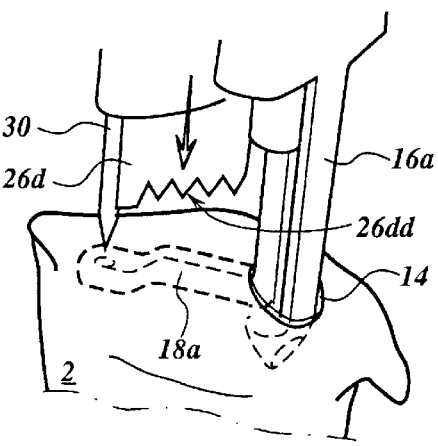

FIGS. 8a and 8b show a combined perforating means and cutting means in the form of a tool 60, which can be used both as a hand tool and as part of an automatically operating device, in the latter case provision being made for means (not shown in any further detail) for moving the components of the tool 60 relative to each other and moving the tool 60 in a suitable manner relative to a slaughtered animal.

The tool 60 comprises a combined hole supporting element and incision supporting element, for short called supporting element 61, which is provided with a through hole 62 and an at least partially through slit 63. The tool 60 also comprises an arm 64, which at its free end is provided with a perforating element 65 with a pointed end 66, and a knife 67 with a cutting edge 68. The arm 64 is connected to the supporting element 61 in such a way that it pivots about a shaft 69, a stop 70 being provided for limiting the movement of the arm 64 in the direction of arrow 71.

The tool 60 is used as follows. The supporting element 61 is inserted under the skin until the hole 62 is situated at the level of an intended hole in the skin. The supporting element 61 can, for example, be slid underneath the belly skin of a bird through the vent opening thereof until the free end of the supporting element runs against the bottom point of the breastbone of the bird. The arm 64 is then moved in the direction of the arrow 71, so that the position of the arm 64 and the supporting element 61 shown in FIG. 8b arises. In this position the perforating element 65 has made a hole in the skin, and the knife 67 has made part of an incision contiguous to the hole in the skin. The tool 60 is then moved in the direction of arrow 72, with the result that the knife 67 completes the intended incision. At the same time, the supporting element 61 is moved out from under the skin.

It will be clear that during manual use of the tool 60, for example, provision is made for spring means (not shown in any further detail), for holding the tool in the position shown in FIG. 8a when no external forces are being exerted thereon. In order to reach the position according to FIG. 8b, the arm 64 is then taken to the supporting element 61, against the spring force supplied by the spring means.

The tool 60 can be designed in the form of shears, by extending the arm 64 and the supporting element 61 at the ends situated near the shaft 69, which is advantageous particularly during manual use of the tool 60.

FIGS. 8c, 8d, 8e, and 8f show the body of a bird 2 having a cloaca opening 14. For clarity, the legs of the bird 2 have been omitted in the Figures, as well as means for bringing and holding the bird 2 in the position shown. As already explained with reference to FIGS. 5c–5f, in the body of the bird a cone-shaped end 16b of a viscera protection element 16a, and part of a combined supporting element 18a have been inserted through the cloaca opening 14. For making an incision in the abdominal skin of the bird 2, a perforating element 30 and a knife 26a (FIG. 8c), 26b (FIG. 8d), 26c (FIG. 8e) or 26d (FIG. 8f) have been provided.

The knife 26a has an essentially S-shaped cutting edge 26aa interacting with the combined supporting element 18a in such a way that, when moving the knife 26a in the direction of the arrow, the incision of the abdominal skin of the bird 2 starts between the breastbone and the cloaca opening 14, and develops in two opposite directions to the breastbone and the cloaca opening. The advantages of such a cutting method have already been explained above in relation to FIG. 6c.

Knife 26b has an essentially Z-shaped cutting edge 26bb providing a similar cutting action as the knife 26a.

Figure 8G:
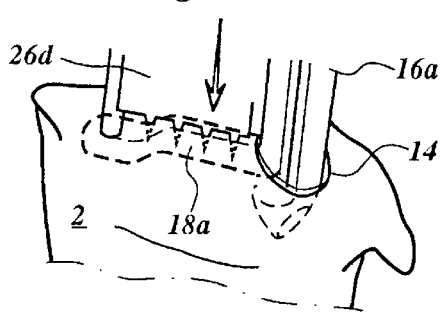
FIG. 8g shows a perspective view illustrating the use of the device according to FIG. 8f.
Figure 8I:
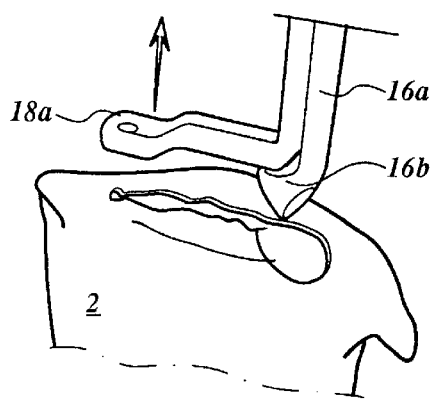
FIG. 8i shows a view in perspective illustrating a subsequent processing stage.
Figure 8H:
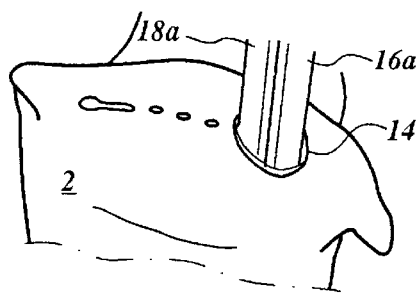
FIG. 8h shows a view in perspective illustrating the result of the processing operation according to FIG. 8g.

Knife 26c is provided four cutting elements 26c1–26c4, each making a sub-incision in the abdominal skin of the bird 2 when being moved in the direction of the arrow. Generally the same result is obtained by the action of knife 26d having a zigzag-shaped cutting edge 26dd. This is illustrated in more detail with FIGS. 8g, 8h, and 8i. FIG. 8g shows the knife 26d interacting with the combined supporting element 18a for making a series of sub-incisions in the abdominal skin of the bird 2. After removing the knife, a pattern of holes in the abdominal skin is left, as FIG. 8h shows. Next, when the combined supporting element 18a is moved upwards in the direction of the arrow, as shown in FIG. 8i, the combined supporting element 18a tears the skin open according to a line interconnecting the sub-incisions made by the knife 26d, thus creating an evisceration opening.

The perforating element 30, 65 respectively shown in the preceding figures, interacting with the supporting element 18, 61, respectively, can be replaced if desired by skin processing means which are adapted for performing a thermal, optical or chemical treatment of part of the skin. As FIG. 7c illustrates, for thermal treatment of a part of the skin 55, a warm or cold gas or a warm or cold liquid can be sprayed onto the skin in a region 55a by means of a tube 56 in which a channel 56a is provided. The temperature and the type of gas or liquid are selected in such a way here that at the position of the region 55a the skin 55 acquires an increased resistance to tearing. It is also possible to introduce a setting liquid through the tube 56 into the region 55a, which liquid on setting gives the skin sufficient strength in the region 55a to prevent tearing. The gas or the liquid can also be selected in such a way that the skin 55 in the region 55a undergoes a chemical change, in order to increase the resistance to tearing. Furthermore, it is possible to irradiate the region 55a of the skin 55 by suitable means, such as a laser, in order to produce the desired resistance to tearing.

Figure 9D:
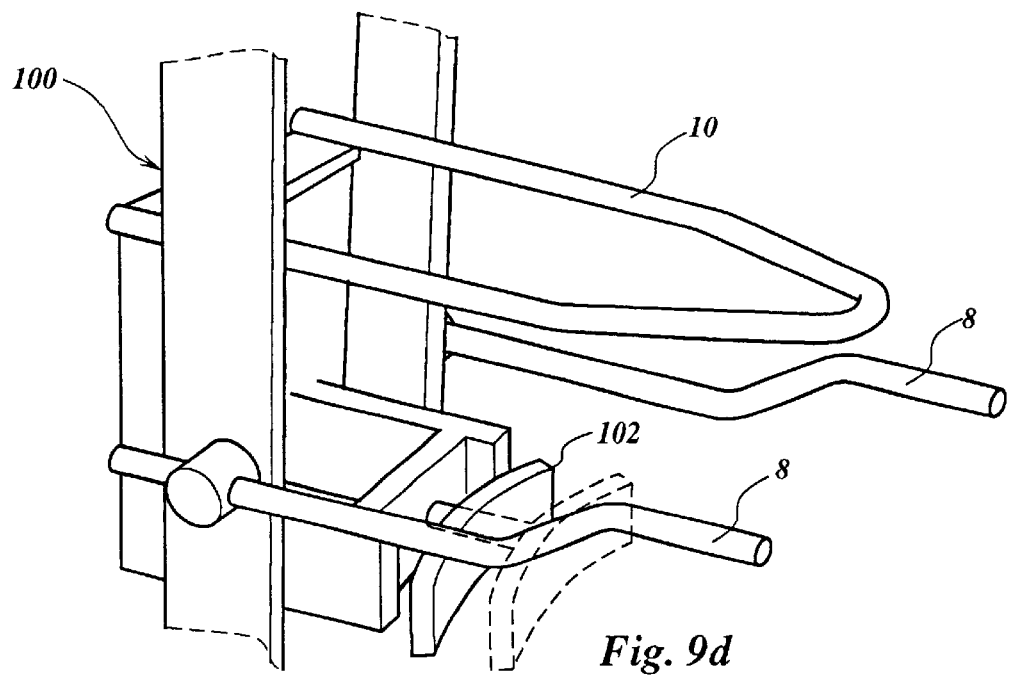
FIG. 9d shows a view in perspective of another embodiment of a part of the device according to the invention.
Figure 9A:
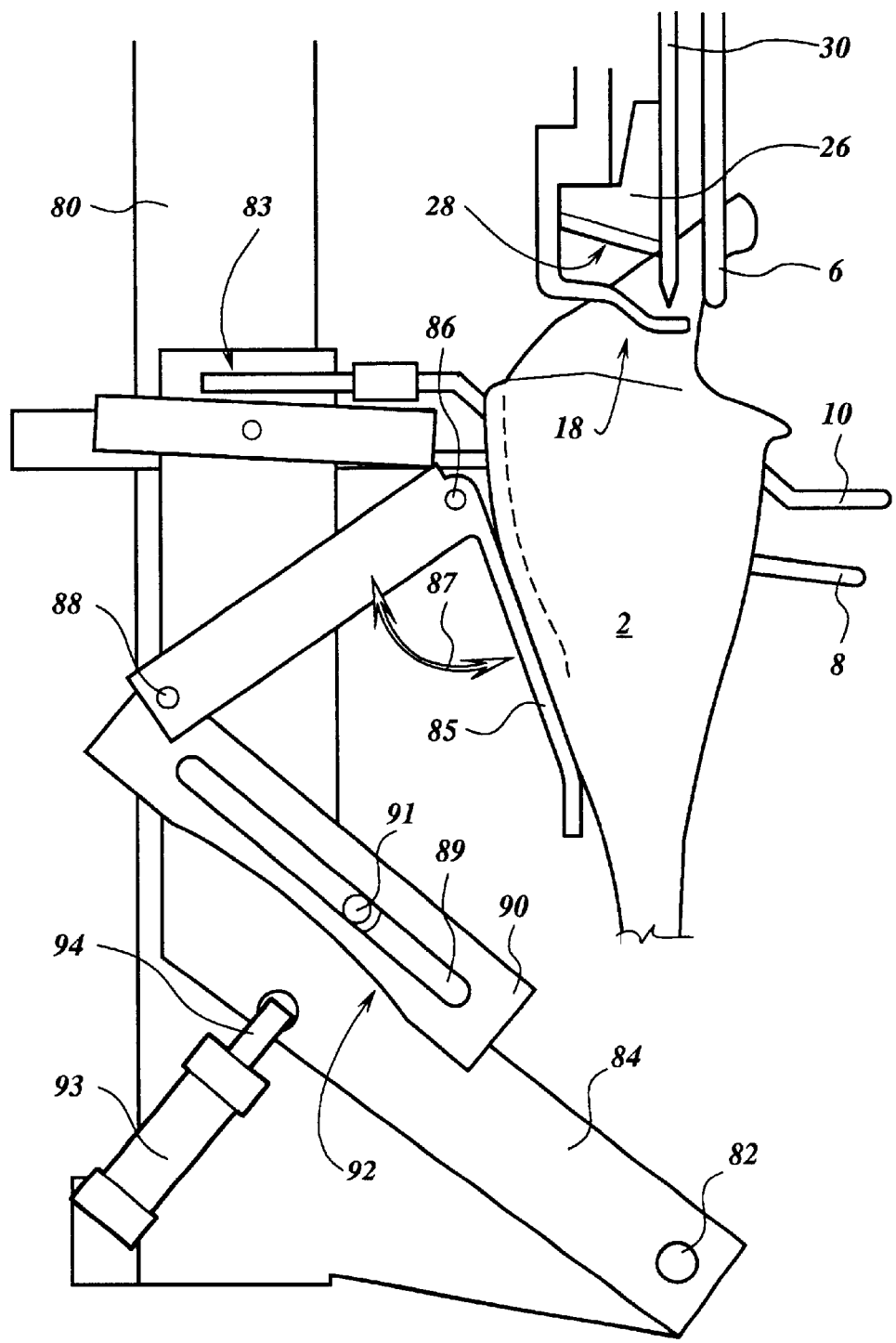
FIGS. 9a, 9b, 9c show side views, partially in cross-section, of a further embodiment of the device according to the invention at various processing stages.
Figure 9B:
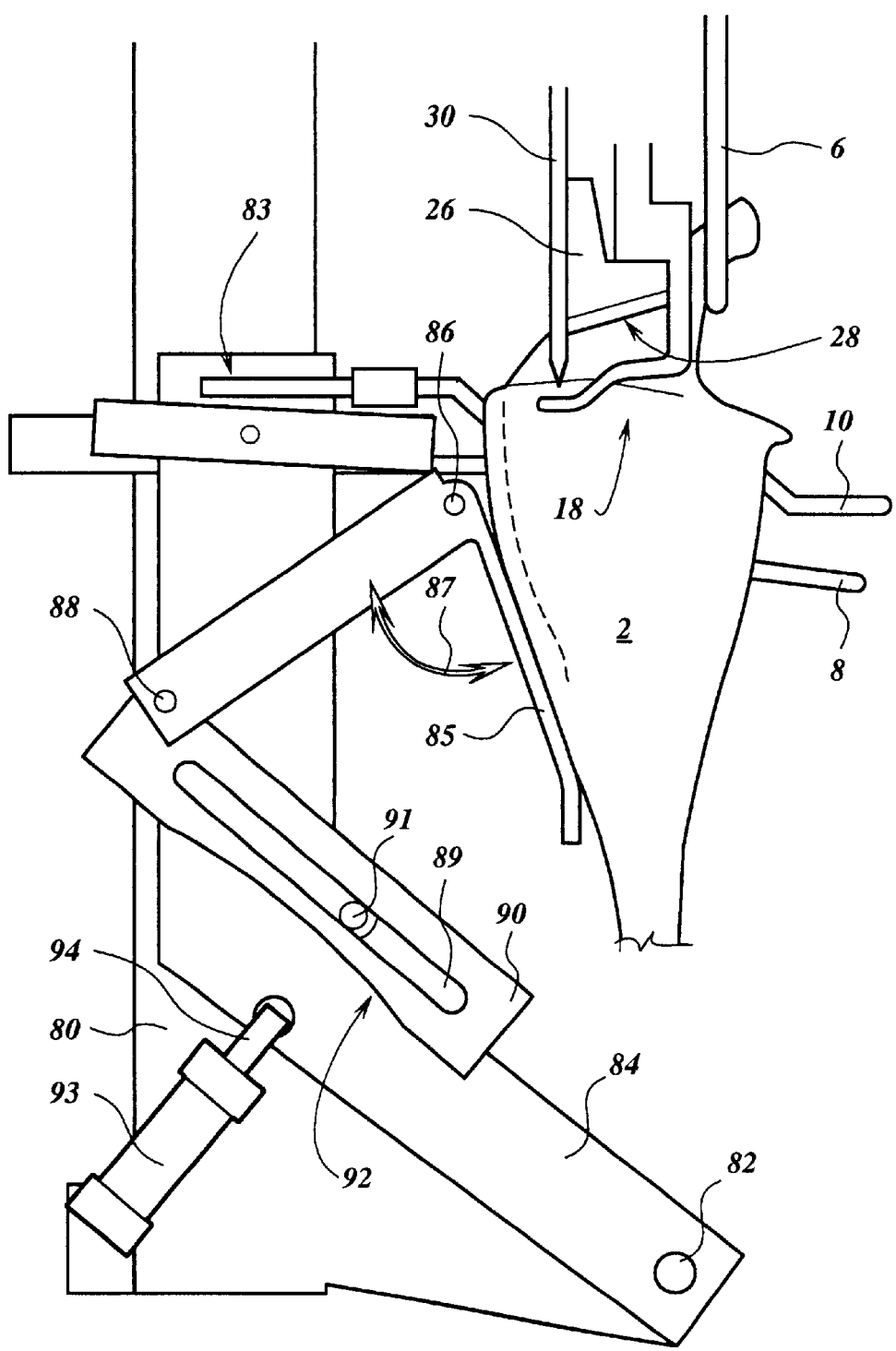
Figure 9C:
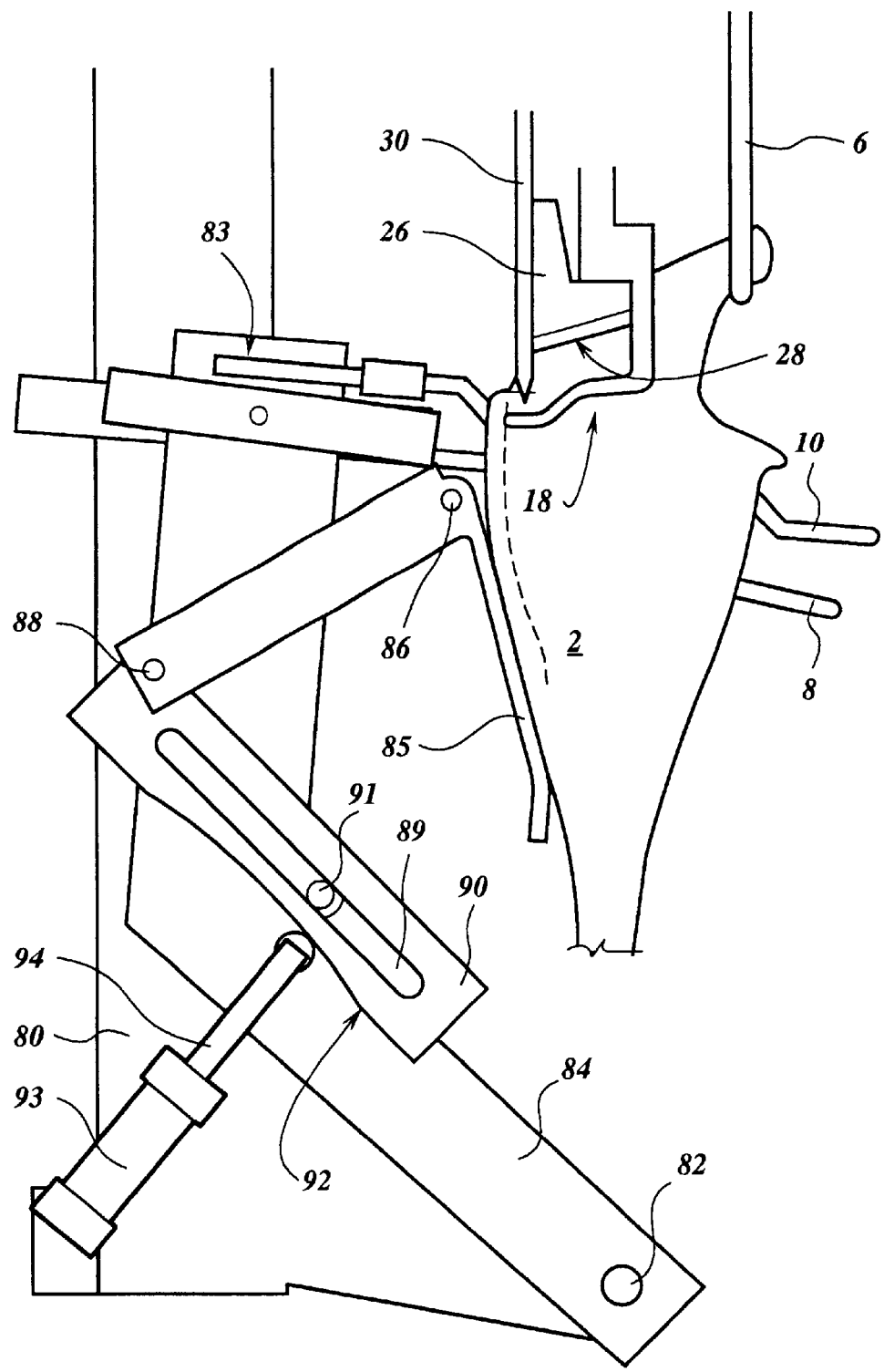

FIGS. 9a, 9b, 9c illustrate an embodiment of positioning means according to the invention and their mode of operation. The figures show a diagrammatically indicated frame 80, relative to which the perforating means and cutting means shown are movable in a predetermined manner, as explained earlier with reference to FIGS. 1–5b. A substantially V-shaped arm 84 is fixed on the frame 80 in such a way that it pivots about a shaft 82 and at the end facing away from the shaft 82 bears the brackets 8 and 10 with a suitable fixing construction 83, which is not explained in any further detail. The bird 2 is fixed in the brackets 8 and 10. A substantially V-shaped sensing arm 85 is also connected in a manner not shown in any further detail to the arm 84 in such a way that it pivots about a shaft 86, as double arrow 87 in FIG. 9a indicates. An end of the sensing arm 85 facing away from the bird is connected, in such a way that it pivots about a shaft 88, to a stop strip 90 provided with a groove 89, a pin 91 projecting into the groove 89, in order to guide the stop strip 90. The stop strip 90 is provided with a contoured side 92. Opposite the contoured side 92, a double-acting piston/cylinder unit 93 is disposed on the frame 80, said unit having a piston rod 94 which is provided with a rounded end and has a predetermined fixed stroke.

The mode of operation of the positioning means shown in FIGS. 9a–9c is as follows. When a bird 2 is clamped in the brackets 8, 10, the sensing arm 85 will assume a certain angular position relative to the shaft 86, depending on the dimensions of the bird 2, with the result that a certain part of the contoured side 92 of the stop strip 90 is situated opposite the end of the piston rod 94. As FIG. 9b shows, the perforating and cutting means are first taken into position in the usual way, as was discussed above with reference to FIGS. 1–3a. The piston rod 94 of the piston/cylinder unit 93 is then extended. As FIG. 9c shows, this causes the arm 84 to tilt about the shaft 82 through an angle which is determined by the contoured side 92 of the stop strip 90, which stop strip 90 in turn is set relative to the pin 91 by the sensing arm 85 on the basis of the dimensions of the bird 2. The angular position of the sensing arm 85 in this case is a measure of the position of the bottom point of the breastbone of the bird 2, the positioning means being dimensioned in such a way that the bottom point of the breastbone contacts the free end of the supporting element 18 when the piston rod 94 is extended. The sensing arm 85 and the stop strip 90 ensure that this position is also reached in the case of birds 2 with other dimensions. However, when a bird 2 is to be processed having a size across the abdominal skin between the cloaca opening and the bottom point of the breastbone which is larger than the length of the foot of the supporting element 18 or 18a, the belly skin may also be cut in subsequent incisions in line with each other, each incision being generally equal to or smaller than the length of the "foot" of the supporting element 18 or 18a, which method allows to avoid tensile stresses in the abdominal skin.

FIG. 9d schematically shows a part of an alternative embodiment of positioning means according to the invention. In a frame, generally indicated at 100, brackets 8 and 10 are mounted fixedly or movably in a manner not shown in further detail. A stop 102 is provided, which can be positioned with positioning means not shown in further detail towards and away from the free ends of the brackets 8, as illustrated by dotted lines in FIG. 9d. The stop 102 may be moved along a path of a fixed length for any size of bird, but the positioning of the stop 102 may also be variable and controlled e.g. by a camera or another sensing device determining the actual position of a bird between the brackets 8, 10, and the desired position of the bird. Any difference between the actual and the desired position is eliminated by a suitable displacement of the stop 102, resting against the breast or the back of a slaughtered animal.

While the invention has been described and illustrated in its preferred embodiments, it should be understood that departures may be made therefrom within the scope of the invention, which is not limited to the details disclosed herein.

What is claimed is:

1. A method for making an incision in the skin of a slaughtered animal, which incision has at least two ends, comprising the steps:

processing the skin at the positions of the at least two ends of the incision, in order to prevent tearing of the skin from said positions onwards; and making an incision for connecting said positions substantially to each other.

2. The method of claim 1, wherein a vent opening produced by cutting out the vent is located at one of the at least two ends and the bottom point of the breastbone of the bird is located at the other of the at least two ends and the incision connects the vent opening and the bottom point of the breastbone.

3. The method of claim 1, wherein the incision contains a plurality of non-interconnected sub-incisions.

4. The method of claim 2, wherein at least a part of the incision is made in the direction from the breastbone up to said position.

5. The method of claim 1, wherein the skin processing operation comprises fitting a clamping element for clamping a part of the skin.

6. The method of claim 1, wherein the skin processing operation comprises thermal treatment of a part of the skin.

7. The method of claim 1, wherein the skin processing operation comprises applying a setting liquid to a part of the skin.

8. The method of claim 1, wherein the skin processing operation comprises making a hole in the skin.

9. The method of claim 8, wherein at least one hole is made in the skin while the incision is being made.

10. The method of claim 8, wherein at least one hole is made in the skin before the incision is made.

11. The method of claim 8, wherein at least one hole in the skin is substantially rounded.

12. The method of claim 8, wherein at least one hole in the skin is punched.

13. The method of claim 8, wherein for forming the at least one hole in the skin a part of the skin with the dimensions of the hole is cut away, leaving a residual connection.

14. The method of claim 8, wherein a hole supporting element is fitted subcutaneously through an opening in the skin, in order to support the skin during the making of at least one hole in the skin.

15. The method of claim 1, wherein an incision supporting element is fitted subcutaneously through an opening in the skin, in order to support the skin during the making of the incision.

16. The method of claim 15, wherein the incision contains a plurality of non-interconnected sub-incisions and after making the sub-incisions, the skin parts between the sub-incisions are torn by the incision supporting element.

17. The method of claim 15, wherein a viscera protection element for protecting the viscera of the slaughtered animal from damage is fitted through the skin opening in the carcass prior to or during the fitting of the incision supporting element.

18. The method of claim 15, wherein during the subcutaneous fitting of the incision supporting element, tissue connections between the belly skin and the viscera, in particular between the belly fat situated on the inside of the belly skin and the stomach, are broken.

19. The method of claim 18, wherein said tissue connections are broken by at least part of the incision supporting element.

20. The method of claim 19, wherein at least part of the incision supporting element is elongated and performs a rotating movement.

21. The method of claim 15, wherein during the subcutaneous fitting of the incision supporting element, tissue connections between the belly skin and the viscera, in particular between the belly fat situated on the inside of the belly skin and the stomach, are broken.

22. The method of claim 21, wherein said tissue connections are broken by at least part of the incision supporting element.

23. The method of claim 22, wherein at least part of the incision supporting element is elongated and performs a rotating movement.

24. The method of claim 14, wherein the incision contains a plurality of non-interconnected sub-incisions and after making the sub-incisions, the skin parts between the sub-incisions are torn by the hole supporting element.

25. The method of claim 14, wherein the carcass of the slaughtered animal is brought to above atmospheric gas pressure at least at the position of the skin processing operation.

26. The method of claim 14, wherein a viscera protection element for protecting the viscera of the slaughtered animal from damage is fitted through the skin opening in the carcass prior to or during the fitting of the hole supporting element.

27. The method of claim 14, wherein during the subcutaneous fitting of the hole supporting element, tissue connections between the belly skin and the viscera, in particular between the belly fat situated on the inside of the belly skin and the stomach, are broken.

28. The method of claim 21, wherein said tissue connections are broken by at least part of the hole supporting element.

29. The method of claim 22, wherein at least part of the hole supporting element is elongated and performs a rotating movement.

30. The method of claim 1, wherein the skin processing operation comprises optical treatment of a part of the skin.

31. The method of claim 1, wherein the skin processing operation comprises chemical treatment of a part of the skin.

32. A device for making an incision in the skin of a slaughtered animal, which incision has at least two ends, comprising:
   processing means for processing the skin at the positions of the at least two ends of the incision, in order to prevent tearing of the skin from said positions onwards; and
   cutting means for making an incision which connects said positions substantially to each other.

33. The device of claim 32, wherein a vent opening produced by cutting out the vent is located at one of the at least two ends and the bottom point of the breastbone of the bird is located at the other of the at least two ends and the incision connects the vent opening and the bottom point of the breastbone.

34. The device of claim 32, wherein the cutting means are adapted for making a series of non-interconnected sub-incisions.

35. The device of claim 32, wherein the skin processing means are adapted for fitting a clamping element for clamping a part of the skin.

36. The device of claim 32, wherein the skin processing means are adapted for performing a thermal treatment of a part of the skin.

37. The device of claim 32, wherein the skin processing means are adapted for applying a setting liquid to a part of the skin.

38. The device of claim 32, wherein the skin processing means consist of perforating means for making a hole in the skin.

39. The device of claim 38, wherein the perforating means comprise a hole supporting element to be fitted under the skin and a perforating element fitted at the other side of the skin, the hole supporting element being adapted to interact with the perforating element to form the hole in the skin.

40. The device of claim 39, wherein the hole supporting element is provided with a hole, and in that the perforating element is adapted to be inserted at least partially in the hole of the hole supporting element, in order to form the hole in the skin.

41. The device of claim 39, wherein the perforating means further comprises a cutting edge.

42. The device of claim 40, wherein the perforating element tapers to a point at the side facing the hole supporting element.

43. The device of claim 40, wherein the perforating element is rounded at the side facing the hole supporting element.

44. The device of claim 40, wherein the transverse dimensions of the hole in the hole supporting element correspond substantially to or are smaller than the transverse dimensions of the part of the perforating element to be inserted in the hole of the hole supporting element.

45. The device of claim 39, wherein the hole supporting element is provided with a stop face, wherein the perforating element is adapted to be moved against the stop face, in order to form the hole in the skin.

46. The device of claim 41, wherein the end of the perforating element facing the hole supporting element is provided with a cutting edge.

47. The device of claim 46, wherein the perforating element comprises a hollow tube.

48. The device of claim 47, wherein the interior of the perforating element is connected to a suction device.

49. The device of claim 41, wherein the cutting edge has ends which do not coincide.

50. The device of claim 32, wherein the cutting means comprise an incision supporting element to be fitted under the skin and a cutting element fitted at the other side of the skin, which incision supporting element is adapted to interact with the cutting element, in order to make the incision.

51. The device of claim 50, wherein the incision supporting element is adapted for breaking tissue connections between the belly skin and the viscera, in particular between the belly fat situated on the inside of the belly skin and the stomach.

52. The device of claim 50, wherein the incision supporting element is rotatable about a substantially vertical axis.

53. The device of claim 50, wherein the cutting means are adapted for making a series of non-interconnected sub-incisions and the incision supporting element is adapted for tearing the skin parts between the sub-incisions.

54. The device of claim 50, further comprising a protection element for protecting the viscera of the slaughtered animal from damage prior to or during the subcutaneous fitting of the incision supporting element.

55. The device of claim 50, wherein the incision supporting element is provided with a slit, and in that the cutting element is adapted to be inserted with a cutting edge thereof at least partially in the slit of the incision supporting element, in order to form the incision.

56. The device of claim 55, wherein the slit of the incision supporting element is bent, the cutting edge of the cutting element being adapted to enter the slit of the incision supporting element in the region of the bend.

57. The device of claim 39, wherein the cutting means are adapted for making a series of non-interconnected sub-incisions and the hole supporting element is adapted for tearing the skin parts between the sub-incisions.

58. The device of claim 33, comprising positioning means for positioning the processing means and the bottom point of the breastbone of the bird relative to each other.

59. The device of claim 58, wherein the positioning means comprise a stop face.

60. The device of claim 59, wherein the stop face is movable.

61. The device of claim 59, wherein the stop face is adapted for making contact against the bottom point of the breastbone.

62. The device of claim 59, wherein the stop face is adapted to act on the outside of the body of the slaughtered animal.

63. The device of claim 61, wherein the skin processing means comprises a hole supporting element and the stop face is fitted on the hole supporting element.

64. The device of claim 58, comprising detection means for determining the position of the bottom point of the breastbone, the positioning means being adapted for positioning the carcass of the bird and the processing means relative to each other on the basis of the detection result of the detection means.

65. The device of claim 32, comprising gas supply means for introducing gas through an opening in the skin into the carcass of the slaughtered animal.

66. The device of claim 65, wherein the gas supply means are operative from outside the carcass.

67. The device of claim 39, comprising a protection element for protecting the viscera of the slaughtered animal from damage prior to or during the subcutaneous fitting of the hole supporting element.

68. The device of claim 67, wherein the protection element is essentially cone-shaped.

69. The device of claim 39, wherein the hole supporting element is adapted for breaking tissue connections between the belly skin and the viscera, in particular between the belly fat situated on the inside of the belly skin and the stomach.

70. The device of claim 39, wherein the hole supporting element is rotatable about a substantially vertical axis.

71. The device of claim 32, wherein the skin processing means comprises a perforating means having a hole supporting element to be fitted under the skin and a perforating element fitted at the other side of the skin, wherein the hole supporting element is adapted to interact with the perforating element to form the hole in the skin, and the cutting means comprises an incision supporting element to be fitted under the skin and a cutting element fitted at the other side of the skin, which incision supporting element is adapted to interact with the cutting element, in order to make the incision.

72. The device of claim 71, wherein the incision supporting element and the hole supporting element are formed by a common supporting element.

73. The device of claim 71, wherein the cutting element and the perforating element are interconnected and are moved in synchronism with each other.

74. The device of claim 32, wherein the skin processing means are adapted for performing an optical treatment of a part of the skin.

75. The device of claim 32, wherein the skin processing means are adapted for performing a chemical treatment of a part of the skin.

* * * * *